(12) United States Patent
Imai

(10) Patent No.: US 11,501,425 B2
(45) Date of Patent: Nov. 15, 2022

(54) VERIFICATION APPARATUS AND INFORMATION PROCESSING METHOD FOR SELECTING AN IMAGE ASSOCIATED WITH A REFERENCE IMAGE

(71) Applicant: CANON KABUSHIKI KAISHA, Tokyo (JP)

(72) Inventor: Seijiro Imai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 17/011,871

(22) Filed: Sep. 3, 2020

(65) Prior Publication Data
US 2021/0073967 A1 Mar. 11, 2021

(30) Foreign Application Priority Data
Sep. 10, 2019 (JP) .............................. JP2019-164557

(51) Int. Cl.
*G06T 7/00* (2017.01)
*H04N 1/00* (2006.01)

(52) U.S. Cl.
CPC ......... *G06T 7/001* (2013.01); *H04N 1/00769* (2013.01); *H04N 1/00771* (2013.01)

(58) Field of Classification Search
CPC . G06T 7/001; H04N 1/00769; H04N 1/00771
USPC ......................................................... 382/112
See application file for complete search history.

(56) References Cited

U.S. PATENT DOCUMENTS

2004/0066526 A1* 4/2004 Inoo ..................... G03G 15/502
358/1.14
2020/0019353 A1* 1/2020 Okajima ............... G06F 3/1257

FOREIGN PATENT DOCUMENTS

JP 2013108770 A 6/2013

* cited by examiner

*Primary Examiner* — Gabriel I Garcia
(74) *Attorney, Agent, or Firm* — Canon U.S.A., Inc. IP Division

(57) ABSTRACT

A verification apparatus according to one embodiment of the present disclosure selects an image associated with a code of a reference image switching sheet as a reference image when the code of the reference image switching sheet is read. An instruction is provided to discharge the reference image switching sheet to a set sheet discharging destination.

12 Claims, 23 Drawing Sheets

FIG. 12

| Time | 3/6 10:10 |
| --- | --- |
| Job name | Invoice |
| Inspection quantity | 1000 sheets |
| OK | 986 sheets |
| NG | 14 sheets |

~1201

Inspection Result

1203
Previous job / Next job
◁  1/3 job  ▷

Please select job to execute.

| | Job name | Reception date and time | |
|---|---|---|---|
| ☑ | Invoice | 20XX/MM/DD | ~1501 |
| ☑ | Estimate | 20XX/MM/DD | |
| ☑ | Leaflet | 20XX/MM/DD | |
| ☐ | Written approval | 20XX/MM/DD | |
| | | | |
| | | | |

Next ~1502    Cancel ~1503

VERIFICATION APPARATUS AND INFORMATION PROCESSING METHOD FOR SELECTING AN IMAGE ASSOCIATED WITH A REFERENCE IMAGE

BACKGROUND

Field of the Disclosure

The present disclosure relates to a verification apparatus, an information processing method, and a storage medium.

Description of the Related Art

In recent years, print systems that uses a verification apparatus to enable inspection of a sheet printed by a print apparatus when the sheet is conveyed are known. In inspection of a print sheet, an operator registers a reference image in advance that is an image to be compared in an inspection system, and the verification apparatus reads an image of the conveyed print sheet and compares the read image with the reference image to determine whether or not the print sheet is normal. The verification apparatus can detect clipping of a barcode or a line, missing of an image, a printing failure, missing of a page, or color shift, for example.

When performing inspection of a plurality of inspection targets at once, it is necessary to register reference images for the number of inspection targets and appropriately select a reference image to be compared in accordance with the inspection target when the inspection is performed.

However, the verification apparatus is unable to detect switching of print targets and thus is unable to automatically switch reference images. Therefore, the operator has to switch one reference image to another reference image for the next inspection target every time inspection of one inspection target is finished. In a case of a large number of inspection targets, operations of switching reference images take place for such a large number of inspection targets. Further, the productivity is reduced for the number of reference image switching operations occurring each time inspection targets are switched.

According to a technology disclosed in Japanese Patent Application Laid-Open No. 2013-108770, when a plurality of reference images are registered, a verification apparatus registers a reference image in association with unique ID, and a print apparatus transfers image ID to the verification apparatus when the inspection target is printed. The verification apparatus selects a reference image associated with the received image ID and uses the selected reference image for inspection and thereby enables automatic switching of reference images. However, some of inspection systems may be configured such that a print apparatus and a verification apparatus are unable to directly communicate with each other. In the case of such a configuration, it is not possible to transfer image ID from the print apparatus to the verification apparatus when an image is printed, and the verification apparatus is unable to automatically switch reference images.

SUMMARY

The present disclosure is a verification apparatus including: a selection unit that, when a code of a reference image switching sheet is read, selects an image associated with the code of the reference image switching sheet as a reference image; and a first instruction unit that provides an instruction to discharge the reference image switching sheet to a set sheet discharging destination.

Further features of the present disclosure will become apparent from the following description of exemplary embodiments with reference to the attached drawings.

BRIEF DESCRIPTION OF THE DRAWINGS

FIG. 2 is a diagram illustrating an example of a hardware configuration of an image forming apparatus or the like.

FIG. 12 is a diagram illustrating an example of a window displayed when an inspection result is displayed.

FIG. 15 is a diagram illustrating an example of a selection window for an inspection job to be executed.

DESCRIPTION OF THE EMBODIMENTS

Embodiments of the present disclosure will be described below with reference to the drawings.

In the following description, an external controller may be referred to as an image processing controller, a digital frontend, a print server, a DFE, or the like. An image forming apparatus may be referred to as a multifunction machine, or a multifunction peripheral or MFP.

First Embodiment

Figure 1:
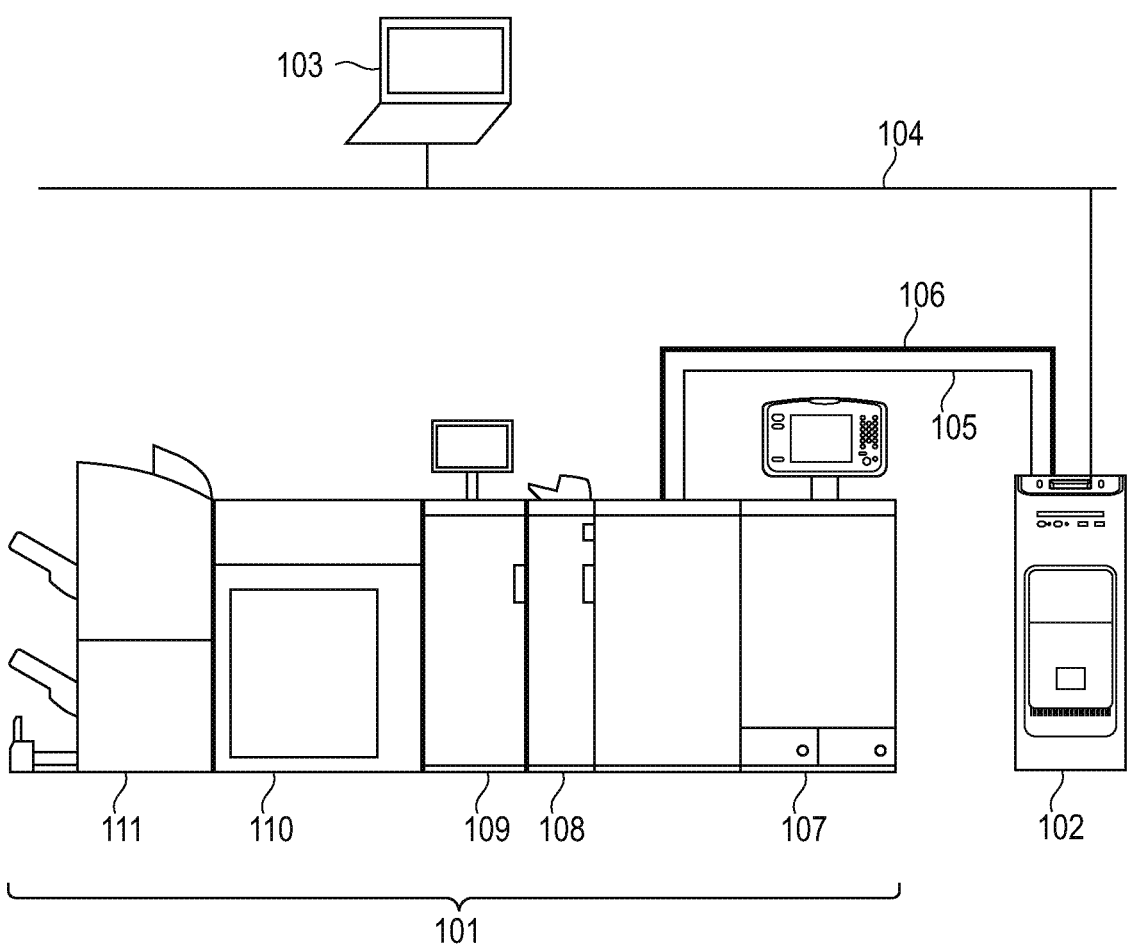
FIG. 1 is a diagram illustrating an example of a system configuration of an image processing system.

FIG. 1 is a diagram illustrating an example of a system configuration of an image processing system. The image processing system has an image forming apparatus 101 and an external controller 102. The image forming apparatus 101 and the external controller 102 are communicably connected to each other via an internal LAN 105 and a video cable 106. The external controller 102 is communicably connected to a client PC 103 via an external LAN 104. A print instruction is provided from the client PC 103 to the external controller 102.

A printer driver having a function of converting print data into a print description language that can be processed by the external controller 102 is installed in the client PC 103. A user who intends to perform printing may provide a print instruction from various applications via the printer driver. The printer driver transmits print data to the external controller 102 based on the print instruction from the user. In response to receiving a print instruction from the client PC 103, the external controller 102 performs data analysis and rasterization and supplies print data to the image forming apparatus 101 to provide a print instruction.

Next, the image forming apparatus 101 will be described. A plurality of apparatuses having different functions are connected to the image forming apparatus 101 and configured to be able to perform a complex print process such as bookbinding.

A print apparatus 107 forms an image by using toner on a sheet conveyed from a sheet feed unit provided in a lower part of the print apparatus 107. The configuration and the operation principle of the print apparatus 107 are as follows. A beam such as laser light modulated in accordance with image data is reflected by a rotary polygonal mirror such as a polygon mirror and emitted as scan light to a photosensitive drum. An electrostatic latent image formed on the photosensitive drum by the laser light is developed with toner, and the toner image thereof is transferred on the sheet attached to a transfer drum. Such a series of image forming process is sequentially performed on yellow (Y) toner, magenta (M) toner, cyan (C) toner, and black (K) toner, and thereby a full-color image is formed on the sheet. The sheet on the transfer drum on which the full-color image is formed is conveyed to a fixing device. The fixing device includes a roller, a belt, and the like, has a built-in heat source such as a halogen heater inside the roller, dissolves, by heat and pressure, the toner on a sheet on which a toner image is transferred, and thereby fixes the toner on the sheet.

An inserter 108 is an apparatus for inserting an inserting sheet. It is possible to insert a sheet from the inserter 108 at any position for a sheet group printed by the print apparatus 107 and conveyed.

A verification apparatus 109 is an apparatus that reads an image in the conveyed sheet, compares the read image with a pre-registered reference image, and thereby determines whether or not a printed image is normal.

A large-capacity stacker 110 is an apparatus that can load a large volume of sheets therein. A finisher 111 is an apparatus that applies a finishing process to a conveyed sheet. The finisher 111 can perform finishing such as stapling, punching, saddle stitch binding, or the like and discharges a sheet to a sheet discharging tray.

Although the print system illustrated in FIG. 1 has a configuration in which the external controller 102 is connected to the image forming apparatus 101, the print system is not limited to the configuration connected to the external controller 102. That is, the print system may be configured such that the image forming apparatus 101 is connected to the external LAN 104 and print data that can be processed by the image forming apparatus 101 is transmitted from the client PC 103. In such a case, data analysis and rasterization are performed in the image forming apparatus 101, and a print process is performed.

Figure 2:
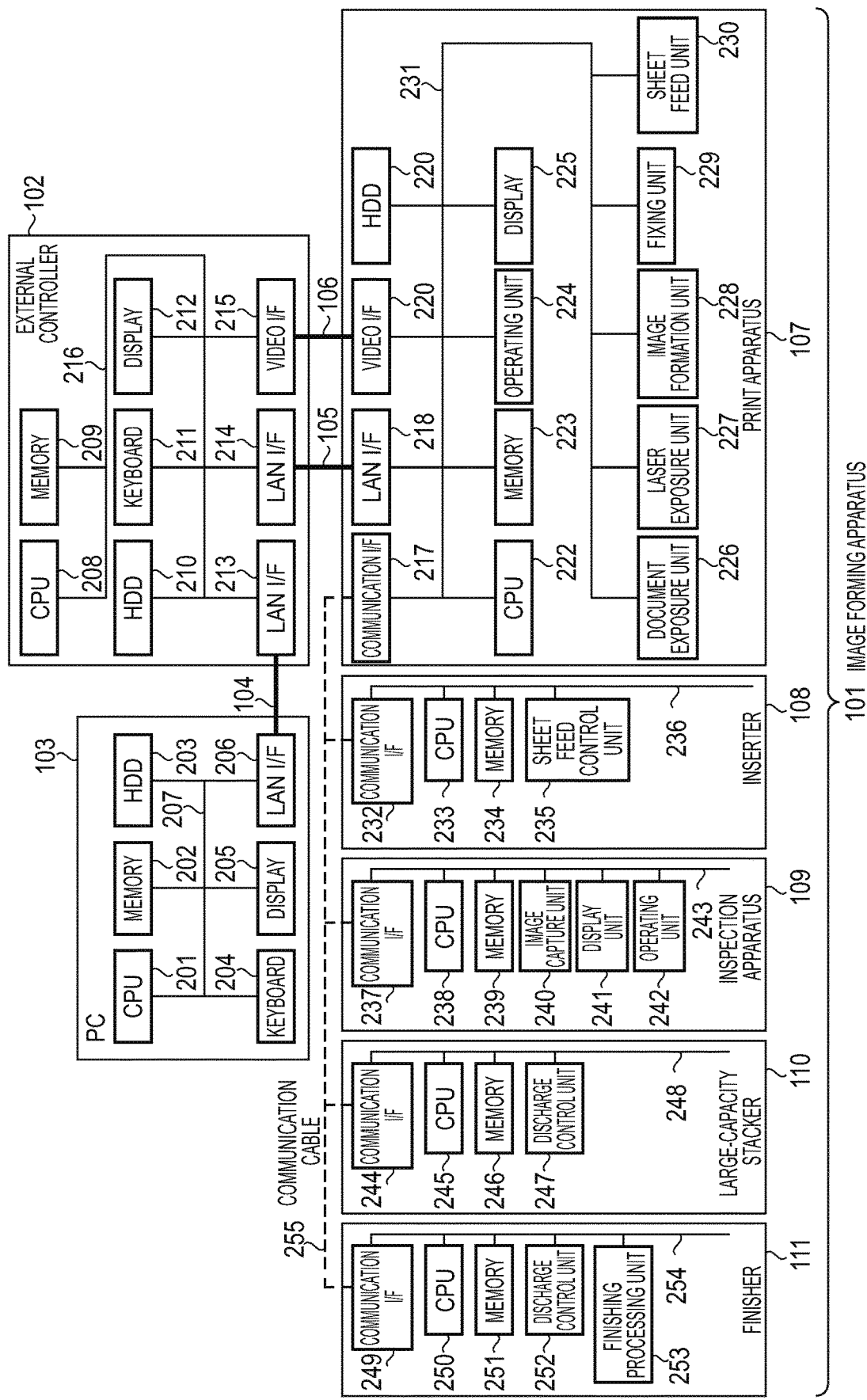

FIG. 2 is a diagram illustrating an example of a hardware configuration of the image forming apparatus 101, the external controller 102, and the client PC 103.

First, the configuration of the print apparatus 107 of the image forming apparatus 101 will be described. The print apparatus 107 of the image forming apparatus 101 is formed of a communication I/F 217, a LAN I/F 218, a video I/F 220, an HDD 221, a CPU 222, a memory 223, an operating unit 224, and a display 225. Furthermore, the print apparatus 107 of the image forming apparatus 101 has a document exposure unit 226, a laser exposure unit 227, an image formation unit 228, a fixing unit 229, and a sheet feed unit 230. These components are connected via a system bus 231.

The communication I/F 217 is connected to the inserter 108, the verification apparatus 109, the large-capacity stacker 110, and the finisher 111 via a communication cable 255, and communication for control of each apparatus or device is performed.

The LAN I/F 218 is connected to the external controller 102 via the internal LAN 105, and communication of print data or the like is performed.

The video I/F 220 is connected to the external controller 102 via the video cable 106, and communication of image data or the like is performed.

The HDD 221 is a storage device in which a program and data are stored. The CPU 222 collectively performs image processing control and printing control based on a program or the like stored in the HDD 221. The memory 223 stores a program and image data required when the CPU 222 performs various processes and operates as a work area. The operating unit 224 accepts input of various settings or an instruction of operation from the user. Setting information on the image processing apparatus, print job process status, or the like are displayed on the display 225.

The document exposure unit 226 performs a process of reading a document when a copy function or a scan function is used. The document exposure unit 226 loads document data by capturing an image by a CCD camera while irradiating a sheet set by the user with an exposure lamp. The laser exposure unit 227 is an apparatus that performs primary charging and laser exposure for irradiating the photosensitive drum with laser light in order to transfer a toner image. In the laser exposure unit 227, first, the primary charging to charge the photosensitive drum surface with an even minus potential is performed. Next, laser light is emitted to the photosensitive drum by a laser driver while the reflection angle is adjusted by a polygon mirror. Thereby, the minus charges on the irradiated portion are neutralized, and an electrostatic latent image is formed.

The image formation unit 228 is an apparatus for transferring toner to a sheet, is formed of a development unit, a transfer unit, a toner replenishment unit, or the like, and transfers toner on the photosensitive drum to the sheet. In the development unit, toner charged with minus charges is attached to an electrostatic latent image on the photosensitive drum surface from a development cylinder, and an image is visualized. In the transfer unit, primary transfer to apply a plus potential to a primary transfer roller and transfer toner on the photosensitive drum surface to the transfer belt is performed, and secondary transfer to apply a plus potential to a secondary transfer outer roller and transfer toner on the transfer belt to a sheet is performed. The fixing unit 229 is an apparatus that dissolves and fixes toner on a sheet by heat and pressure and is formed of a heater, a fixing belt, a pressing belt, or the like. The sheet feed unit 230 is an apparatus that supplies a sheet in which a feed operation and a conveying operation of a sheet are controlled by using a roller or various sensors.

Next, the configuration of the inserter 108 of the image forming apparatus 101 will be described. The inserter 108 of the image forming apparatus 101 is formed of a communication I/F 232, a CPU 233, a memory 234, and a sheet feed control unit 235, and these components are connected via a system bus 236. The communication I/F 232 is connected to the print apparatus 107 via the communication cable 255, and communication required for control is performed. The CPU 233 performs various control required for sheet feeding in accordance with a control program stored in the memory 234. The memory 234 is a storage device storing a control program. The sheet feed control unit 235 controls feeding and conveyance of a sheet conveyed from the sheet feed unit of the inserter or the print apparatus 107 while controlling a roller and a sensor based on an instruction from the CPU 233.

Next, the configuration of the verification apparatus 109 of the image forming apparatus 101 will be described. The verification apparatus 109 of the image forming apparatus 101 is formed of a communication I/F 237, a CPU 238, a memory 239, an image capture unit 240, a display unit 241, and an operating unit 242, and these components are connected via a system bus 243. The communication I/F 237 is connected to the print apparatus 107 via the communication cable 255, and a communication required for control is performed. The CPU 238 performs various control required for inspection in accordance with a control program stored in the memory 239. The memory 239 is a storage device storing a control program. The image capture unit 240 captures an image of a conveyed sheet based on an instruction from the CPU 238. The CPU 238 compares an image captured by the image capture unit 240 with a reference image stored in the memory 239 and determines whether or not the printed image is normal. An inspection result, a setting window, or the like are displayed on the display unit 241. The operating unit 242 is operated by the user and accepts an instruction of a change of a setting, registration of a reference image, or the like for the verification apparatus 109.

Next, the configuration of the large-capacity stacker 110 of the image forming apparatus 101 will be described. The large-capacity stacker 110 of the image forming apparatus 101 is formed of a communication I/F 244, a CPU 245, a memory 246, and a discharge control unit 247, and these components are connected via a system bus 248. The communication I/F 244 is connected to the print apparatus 107 via the communication cable 255, and communication required for control is performed. The CPU 245 performs various control required for discharge in accordance with a control program stored in the memory 246. The memory 246 is a storage device storing a control program. The discharge control unit 247 performs control to convey a conveyed sheet to a stack tray, an escape tray, or the subsequent finisher 111 based on an instruction from the CPU 245.

Next, the configuration of the finisher 111 of the image forming apparatus 101 will be described. The finisher 111 of the image forming apparatus 101 is formed of a communication I/F 249, a CPU 250, a memory 251, a discharge control unit 252, and a finishing processing unit 253, and these components are connected via a system bus 254. The communication I/F 249 is connected to the print apparatus 107 via the communication cable 255, and communication required for control is performed. The CPU 250 performs various control required for finishing or discharge in accordance with a control program stored in the memory 251. The memory 251 is a storage device storing a control program. The discharge control unit 252 controls conveyance and discharge of a sheet based on an instruction from the CPU 250. The finishing processing unit 253 controls a finishing process such as stapling, punching, saddle stitch binding, or the like based on an instruction from the CPU 250.

Next, the configuration of the external controller 102 will be described. The external controller 102 is formed of a CPU 208, a memory 209, an HDD 210, a keyboard 211, a display 212, a LAN I/F 213, a LAN I/F 214, and a video I/F 215, and these components are connected via a system bus 216. The CPU 208 collectively performs processing such as reception of print data from the client PC 103, a RIP process, transmission of print data to the image forming apparatus 101, or the like based on a program and data stored in the HDD 210. The memory 209 stores a program and data required when the CPU 208 performs various processes and operates as a work area. The HDD 210 stores a program and data required for an operation of a print process or the like. The keyboard 211 is a device for inputting an operation instruction of the external controller 102. Information on an executing application or the like of the external controller 102 is displayed on the display 212 with a video signal of a static image or a moving image. The LAN I/F 213 is connected to the client PC 103 via the external LAN 104, and communication of a print instruction or the like is performed. The LAN I/F 214 is connected to the image forming apparatus 101 via the internal LAN 105, and communication of a print instruction or the like is performed. The video I/F 215 is connected to the image forming apparatus 101 via the video cable 106, and communication of print data or the like is performed.

Next, the configuration of the client PC 103 will be described. The client PC 103 is formed of a CPU 201, a memory 202, an HDD 203, a keyboard 204, a display 205, and a LAN I/F 206, and these components are connected to a system bus 207. The CPU 201 creates print data and provides a print instruction based on a document processing program or the like stored in the HDD 203. Further, the CPU 201 collectively controls each device connected to the system bus. The memory 202 stores a program and data required when the CPU 201 performs various processes and operates as a work area. The HDD 203 stores a program and data required for an operation of a print process or the like. The keyboard 204 is a device for inputting an operation instruction of the client PC 103. Information on an executing application or the like of the client PC 103 is displayed on the display 205 with a video signal of a static image or a moving image. The LAN I/F 206 is connected to the external LAN 104, and communication of a print instruction or the like is performed.

Although the external controller 102 and the image forming apparatus 101 are connected to the internal LAN 105 and the video cable 106 in the above description, a connection configuration with only the video cable may be possible, for example, as long as data required for printing can be transmitted and received. Further, each of the memory 202, the memory 209, the memory 223, the memory 234, the memory 239, the memory 246, and the memory 251 may be any storage device used for holding data and a program. For example, a volatile RAM, a nonvolatile ROM, a built-in HDD, an external HDD, a USB memory, or the like may be replaced.

Figure 3:
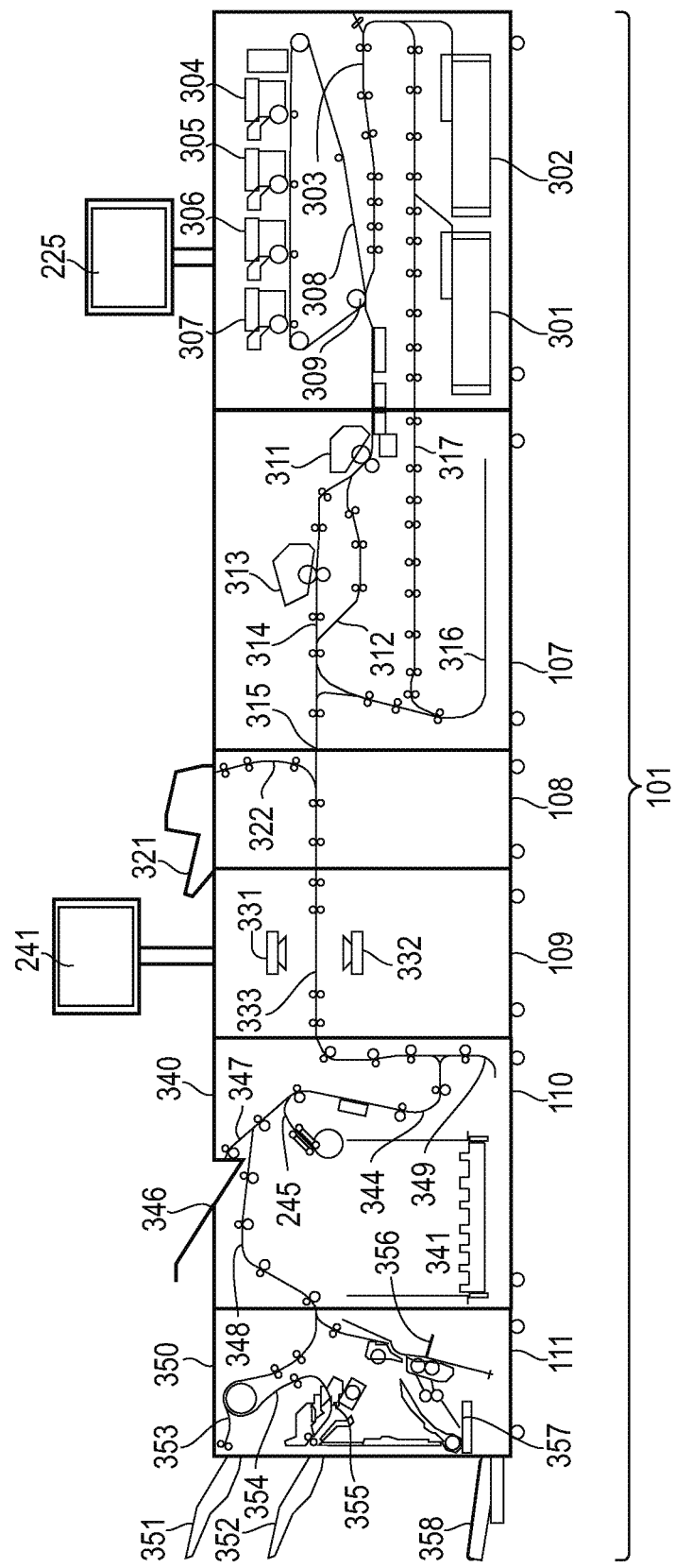
FIG. 3 is a diagram illustrating an example a mechanical cross section of the image forming apparatus.

FIG. 3 is a diagram illustrating an example of a mechanical cross section of the image forming apparatus 101. The print apparatus 107 forms an image to be printed on a sheet. Paper feed decks 301 and 302 are paper feed decks. Various sheets can be accommodated in each paper feed deck. In each paper feed deck, it is possible to separate only one sheet at the top of the accommodated sheets and convey the separated sheet to a sheet conveyance path 303. In development stations 304 to 307, a toner image is formed by using color toner of Y, M, C, and K, respectively, in order to form a color image. The toner image formed herein is primarily transferred to an intermediate transfer belt 308, the intermediate transfer belt 308 rotates a drawing clockwise, and a toner image is transferred to a sheet conveyed from the sheet conveyance path 303 at a secondary transfer position 309. The display 225 displays the printing status or information used for setting of the image forming apparatus 101. The fixing unit 311 fixes a toner image onto a sheet. The fixing unit 311 has a pressing roller and a heat roller, and when a sheet passes between these rollers, toner is melt and crimped, and thereby a toner image is fixed on the sheet. The sheet that has passed through the fixing unit 311 is conveyed to 315 through the sheet conveyance path 312. When further melting and crimping is necessary for fixing due to the type of a sheet, the sheet is conveyed to a second fixing unit 313 by using the above sheet conveyance path after passing through the fixing unit 311, and the sheet is conveyed to 315 through the sheet conveyance path 314 after additional melting and crimping are applied. When the image forming mode is for both sides, after the sheet is conveyed to a sheet reverse path 316 and reversed on the sheet reverse path 316, the sheet is conveyed to a two-sided conveyance path 317, and the second image transfer is performed at the secondary transfer position 309.

The inserter 108 is an apparatus for inserting an insertion sheet. The inserter 108 has a tray 321 and causes a sheet fed through the sheet conveyance path 322 to join with the conveyance path. Accordingly, it is possible to insert a sheet at any position into a series of sheet groups conveyed from the print apparatus 107 to be conveyed to the subsequent apparatus.

The sheet that has passed through the inserter 108 is conveyed to the verification apparatus 109. Cameras 331 and 332 are arranged so as to face each other inside the verification apparatus 109. The camera 331 is a camera that reads the upper side of a sheet, and the camera 332 is a camera that reads the underside of a sheet. The verification apparatus 109 can read images of a sheet by using the cameras 331 and 332 at a timing when the sheet conveyed to the sheet conveyance path 333 reaches a predetermined position and determine whether or not an image from the apparatus is normal. A result of inspection performed by the verification apparatus 109 or the like are displayed on the display unit 241.

The large-capacity stacker 110 is a large-capacity stacker in which a large volume of sheets can be loaded. The large-capacity stacker 110 has a stack tray 341 as a tray on which sheets are loaded. The sheet that has passed through the verification apparatus 109 is input to the large-capacity stacker 110 through a sheet conveyance path 344. The sheet is loaded on the stack tray 341 from the sheet conveyance path 344 via a sheet conveyance path 345. Furthermore, a stacker 340 has an escape tray 346 as a sheet discharging tray. The escape tray 346 is a sheet discharging tray used for discharging a sheet determined as a defective sheet by the verification apparatus 109. When output to the escape tray 346, a sheet is conveyed to the escape tray 346 from the sheet conveyance path 344 via a sheet conveyance path 347. Note that, when a sheet is conveyed to a post-processing apparatus on the post stage of the large-capacity stacker 110, the sheet is conveyed via the sheet conveyance path 348. A reverse unit 349 is a reverse unit that reverses a sheet. The reverse unit 349 is used when a sheet is loaded on the stack tray 341. A sheet is once reversed in the reverse unit 349 when loaded to the stack tray 341 so that the orientation of an input sheet and the orientation of the sheet at output are the same. When conveyed to the escape tray 346 and the subsequent apparatus, since a sheet is discharged without being flipped when loaded, no reversing operation is performed at the reverse unit 349.

The finisher 111 applies a finishing process to a conveyed sheet in accordance with a function specified by the user. Specifically, the finisher 111 has finishing functions such as stapling (one-part binding, two-part binding), punching (two holes, three holes), saddle stitch binding, and the like. The finisher 111 has two sheet discharging trays of a sheet discharging tray 351 and a sheet discharging tray 352, and sheets are output to the sheet discharging tray 351 via a sheet conveyance path 353. On the sheet conveyance path 353, however, no finishing process such as stapling can be performed. When a finishing process such as stapling is performed, a finishing function specified by the user is performed at a processing unit 355 via a sheet conveyance path 354, and sheets are output to the sheet discharging tray 352. The sheet discharging trays 351 and 352 can be moved up and down, respectively, and can operate so that the sheet discharging tray 351 is moved down and sheets on which a finishing process has been performed at the processing unit 355 are loaded on the sheet discharging tray 351. When saddle stitch binding is specified, after a staple process is performed on the center of a sheet at a saddle stitch processing unit 356, a sheet is double-folded and output to a saddle stitch tray 358 via a sheet conveyance path 357. The saddle stitch tray 358 has a belt conveyer configuration and is configured such that a saddle stitched bundle loaded on the saddle stitch tray 358 is conveyed to the left side.

FIG. 4 to FIG. 16 are examples of the display screen of the verification apparatus 109, which are displayed based on an instruction of the CPU 238 of the verification apparatus 109. The verification apparatus 109 inspects a transmitted sheet image in accordance with a preset inspection item. Inspection of a sheet image is performed by comparing a preset reference image with the transmitted sheet image. A method of comparing images may be a method of comparing pixel values for each pixel position, a method such as comparison of object positions by using edge detection, extraction of text data by using Optical Character Recognition (OCR), or the like. The inspection item may be for displacement of a printing position, the tinge of an image, a concentration of an image, stripe or fading, missing of printing, or the like.

Figure 4:
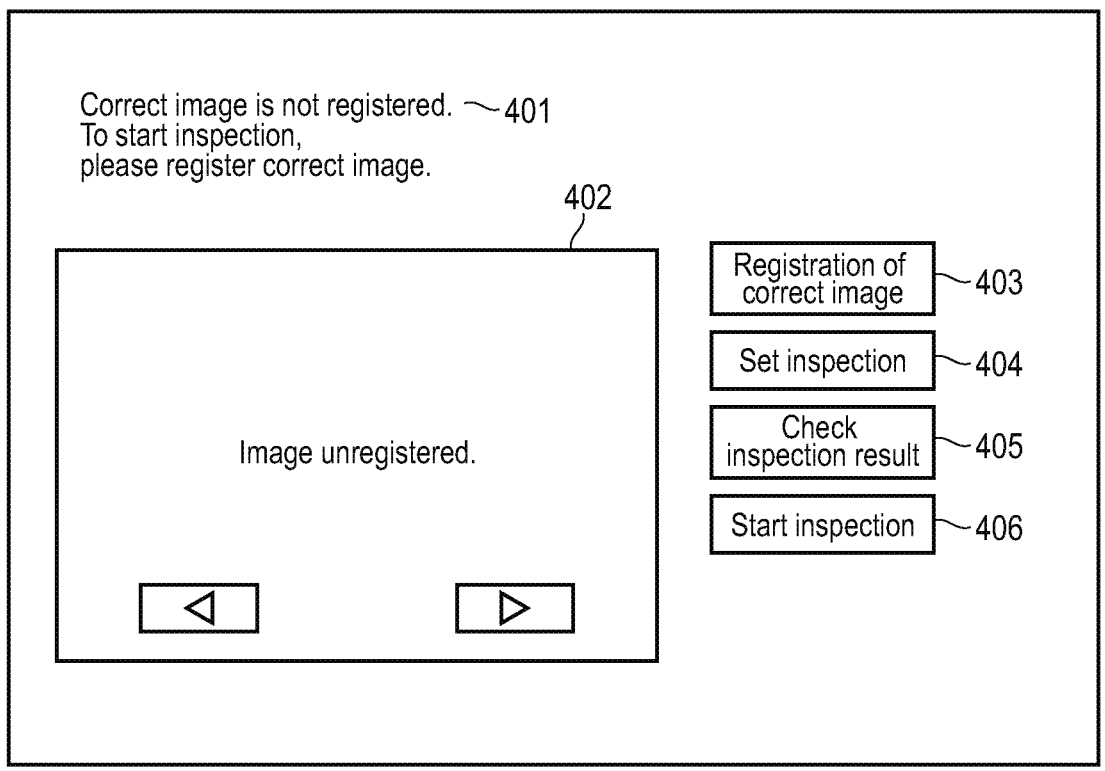
FIG. 4 is a diagram illustrating an example of a window displayed on a display unit when a verification apparatus is started up.

FIG. 4 is a diagram illustrating an example of a window displayed on the display unit 241 of the verification apparatus 109 when the verification apparatus 109 is started up.

In a display part 401, it is indicated that, since no reference image is registered, registration of a reference image is required in order to start inspection.

In a display part 402, a registered reference image is displayed. In FIG. 4, since no reference image is registered, it is indicated that no registration has been made. Display when a reference image is registered will be described later.

A button 403 is a button used for calling a registration window for a reference image. The reference image is an image to be compared with an image read by the verification apparatus 109, and an image obtained by reading a print sheet determined as being normally printed by visual inspection in advance or the verification apparatus 109 is used.

A button 404 is a button used for calling a setting window for inspection. On the setting window, the user sets an item of inspection and accuracy of inspection (at what degree of a difference from the reference image it is determined to be a defective image) in accordance with a user's purpose of inspection.

A button 405 is a button used for calling a check window of an inspection result. The user may check the past inspection content and the inspection result in the check window.

A button 406 is a button used for providing an instruction to start inspection. Once inspection is started, the verification apparatus 109 starts inspection of a transmitted sheet image.

Figure 5:
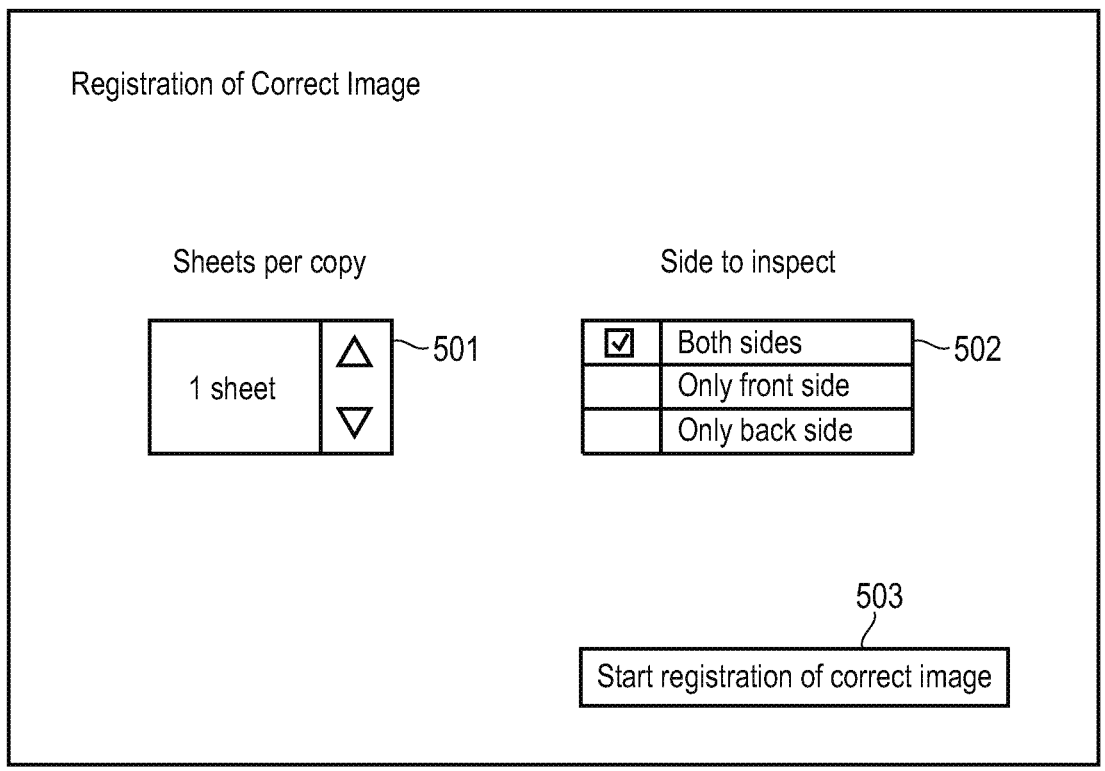
FIG. 5 is a diagram illustrating an example of a window displayed when a reference image is registered.

FIG. 5 is a diagram illustrating an example of a window displayed on the display unit 241 of the verification apparatus 109 when a reference image is registered. The display window of FIG. 5 is displayed when the button 403 of FIG. 4 is selected.

A setting part 501 is a setting part used for setting the number of sheets per one copy of print job to be inspected. Ina case of a print job with two or more sheets per one copy, a plurality of images can be registered as reference images in the verification apparatus 109.

A setting part 502 is a setting part used for setting the side to be inspected. The user may use the setting part 502 to set which of both sides, only the front side, or only the back side the inspection performed by the verification apparatus 109 is applied to. Note that, even when one side is printed, it may be set to perform inspection on both sides in order to perform inspection to see if no dust is attached on the non-printed side.

A button 503 is a button used for providing an instruction for registration of a reference image. After the button 503 is selected, the verification apparatus 109 reads a sent reference image switching sheet and an image of a print sheet and registers the image as a reference image. A unique barcode is printed in the reference image switching sheet. The verification apparatus 109 stores the reference image in association with the read barcode image.

Figure 6:
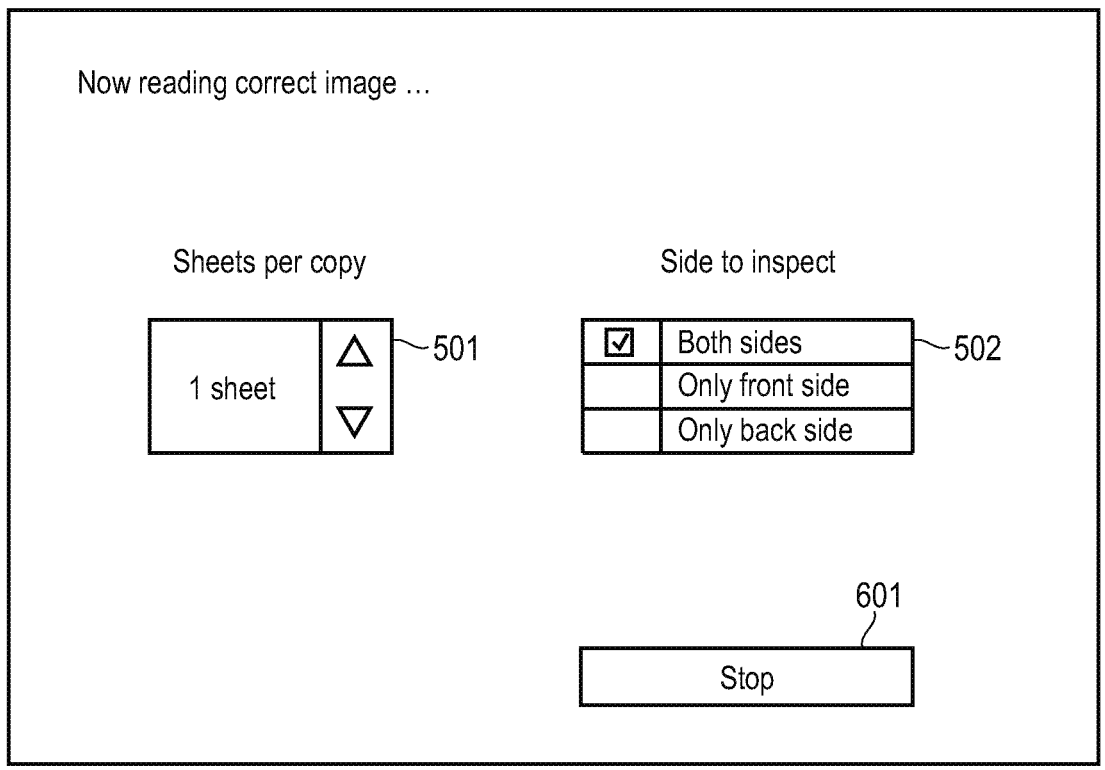
FIG. 6 is a diagram illustrating an example of a window displayed during a reference image being read.

FIG. 6 is a diagram illustrating an example of a window displayed on the display unit 241 of the verification apparatus 109 during a reference image being read. FIG. 6 is displayed when the button 503 of FIG. 5 is selected. This window is displayed from the start of reading of a sheet with a printed barcode to the completion of reading of sheets for the number of sheets set by the setting part 501.

A button 601 is a button used for providing an instruction to cancel reading of a reference image. When the button 601 is selected, the verification apparatus 109 returns the window to the display window of FIG. 4 without performing registration of a reference image.

Figure 7:
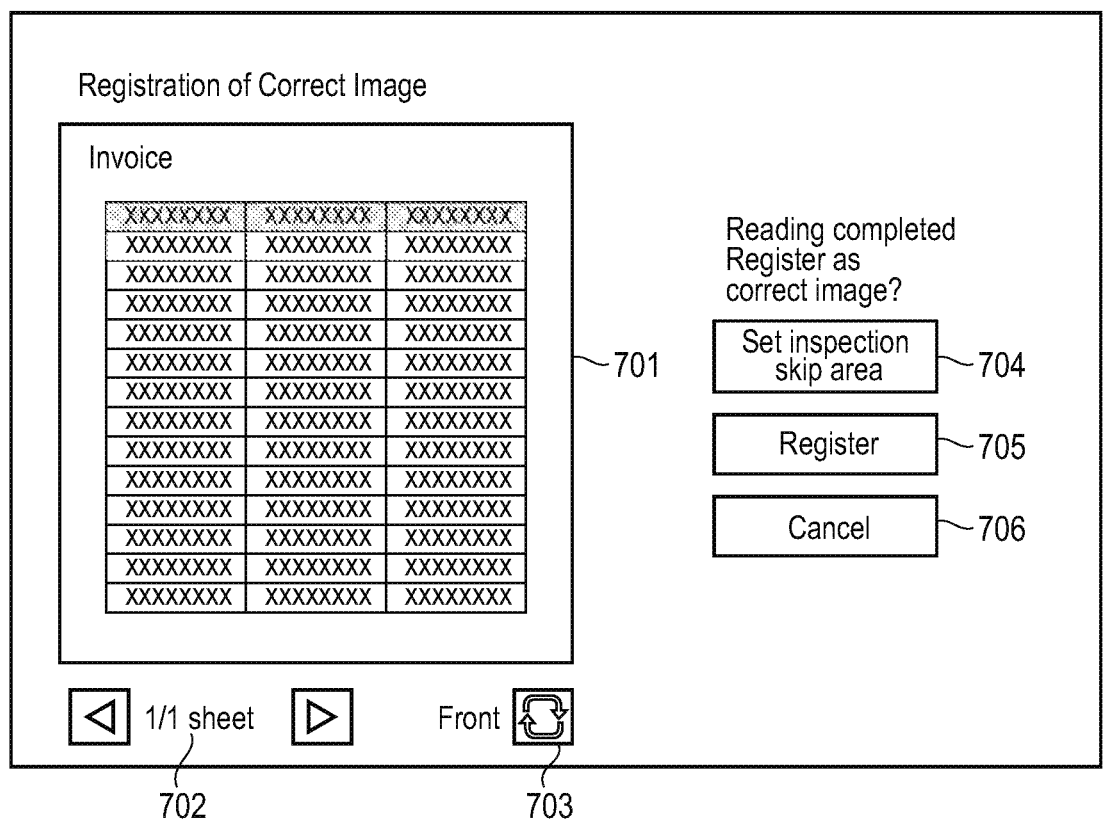
FIG. 7 is a diagram illustrating an example of a window displayed after reading of reference image is completed.

FIG. 7 is a diagram illustrating an example of a window displayed on the display unit 241 of the verification apparatus 109 after reading of a reference image is completed. An image of a print sheet read by the verification apparatus 109 is displayed on the display unit 701. The image to be displayed is switched by a switching button 702 in a case of a plurality of images, and the front side and the back side are switched by a switching button 703 when both the front and back sides are inspected.

A button 704 is a button used for providing an instruction to set an inspection skip area. In this example, it is possible to set an area where no inspection is performed for a case where, for example, printing is performed by changing the printing content of a particular area for each copy, such as variable data printing (VDP). There may be a case where different ID is printed for each copy or a case where only an address or a name is changed for each copy.

A button 705 is a button used for providing an instruction to register a reference image after a read image on the display unit 701 is checked. When the button 705 is selected, the verification apparatus 109 registers the reference image and returns the window to the display window of FIG. 4.

A button 706 is a button used when cancelling reading. When the button 706 is selected, the verification apparatus 109 returns the window to the display window of FIG. 4 without registering a reference image.

Figure 8:
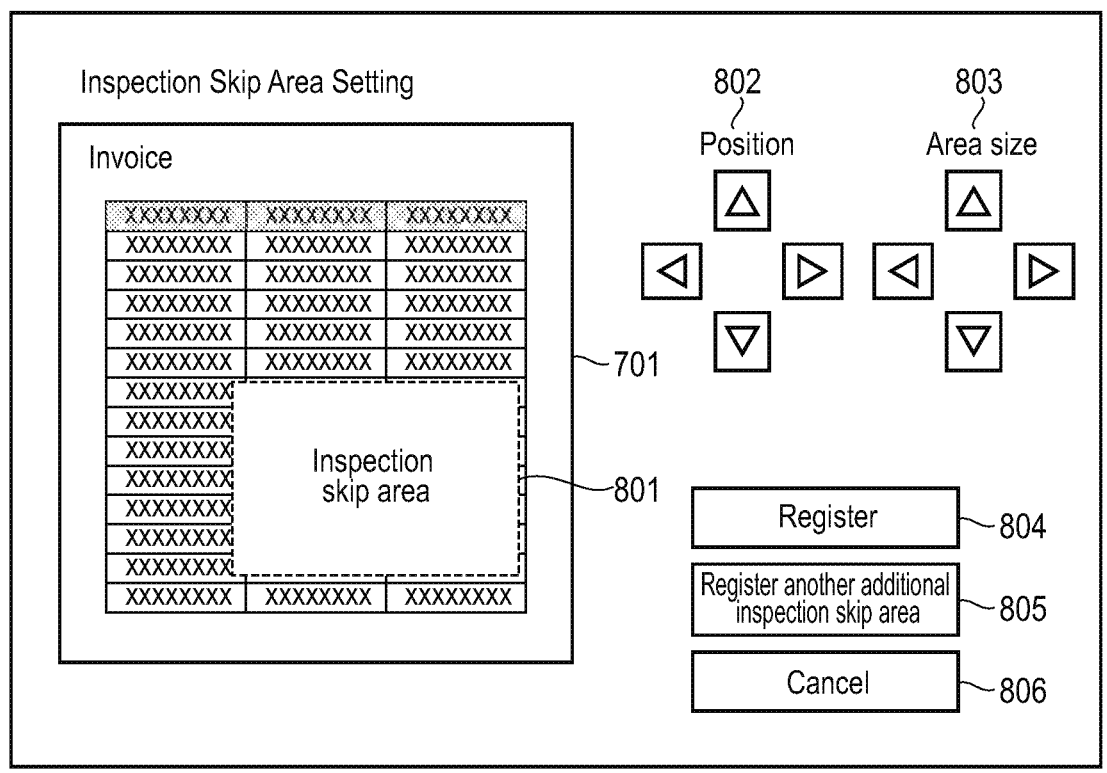
FIG. 8 is a diagram illustrating an example of a setting window for an inspection skip area.

FIG. 8 is a diagram illustrating an example of a setting window for an inspection skip area displayed when the button 704 is selected. An area 801 is a region for indicating an inspection skip area. The user may change the position of the area 801 at the position setting unit 802 and change the size of the area 801 by using a size setting part in 803.

A button 804 is a button used for registering a setting of an inspection skip area. When the button 804 is selected, the verification apparatus 109 registers an inspection skip area and returns the window to the display window of FIG. 7.

A button 805 is a button used for registering an inspection skip area and registering another additional inspection skip area. A plurality of inspection areas can be registered in the verification apparatus 109. A button 806 is a button used for cancelling setting of an inspection skip area. When the button 806 is selected, the verification apparatus 109 returns the window to the display window of FIG. 7 without registering an inspection skip area.

Figure 9:
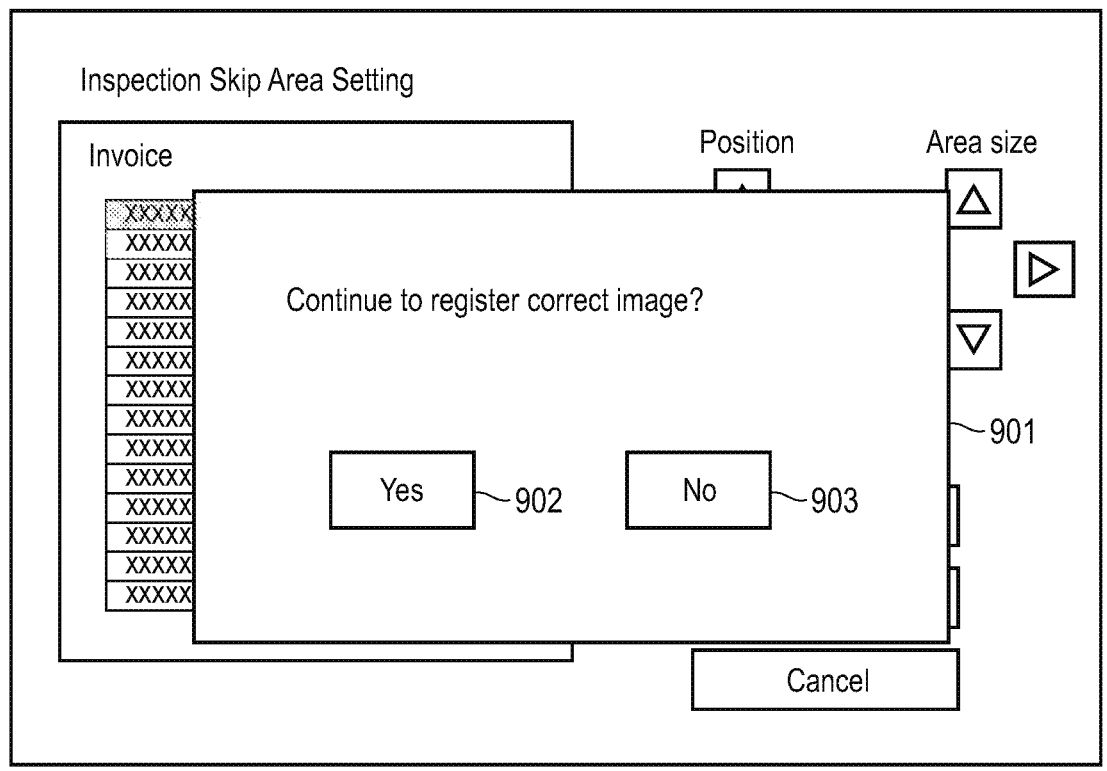
FIG. 9 is a diagram illustrating an example of a popup display to inquire whether or not the next reference image is registered.

FIG. 9 is a diagram illustrating an example of a popup display to inquire whether or not the next reference image is continuously registered. A popup 901 is displayed when the button 705 is selected. FIG. 9 is an example when the button 705 is selected. When a button 902 is selected, the window transitions to the registration window for a reference image of FIG. 5, and registration of the next reference image is performed. Further, when the button 902 is selected, the verification apparatus 109 ends the registration operation for a reference image and returns the window to the display window of FIG. 4.

Figure 10:
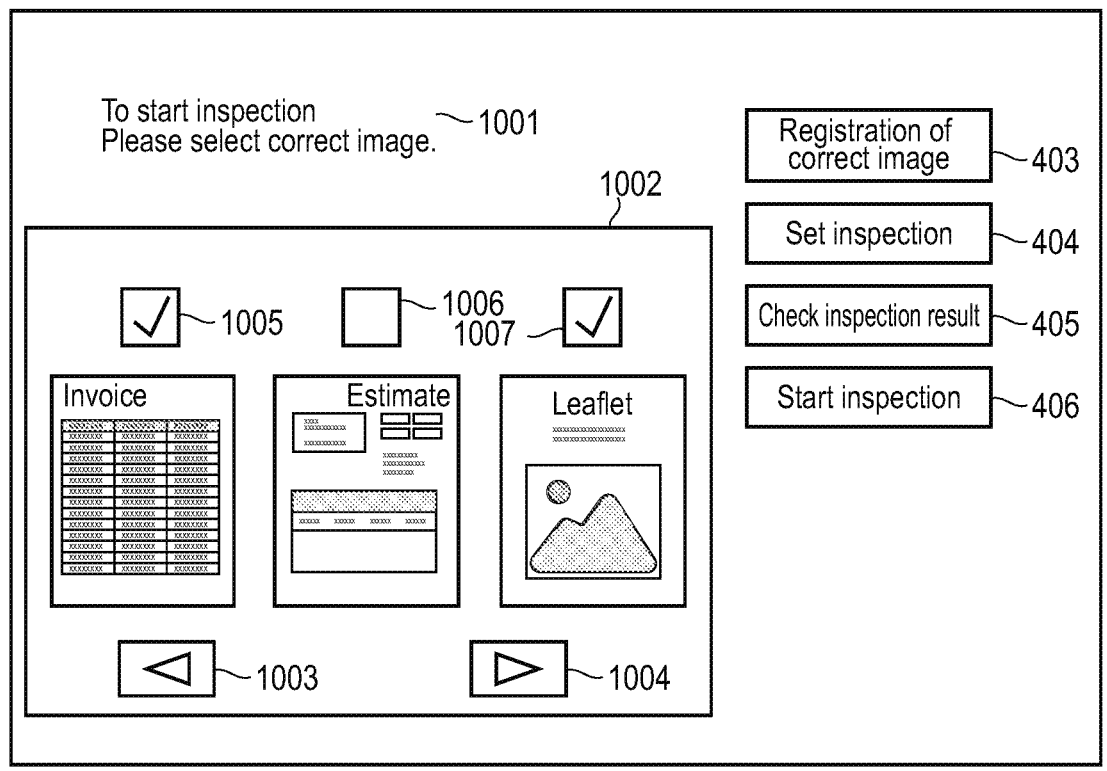
FIG. 10 is a diagram illustrating an example of a home window displayed when a plurality of reference images are registered.

FIG. 10 is a diagram illustrating an example of a home window displayed on the display unit 241 of the verification apparatus 109 when a plurality of reference images are registered. A message 1001 is a message that prompts the user to select an image to be used for inspection from a plurality of registered reference images. A plurality of registered reference images are displayed in an area 1002. Scroll buttons 1003 and 1004 are buttons used for scrolling the window horizontally to select a reference image outside the window. Selection boxes 1005 to 1007 correspond to respective reference images and are boxes used for selecting whether or not respective reference images are reference images to be used for inspection. When one or more images used for inspection are selected from the display unit 241, a checkmark is displayed in each of the selection boxes 1005 to 1007. The selection boxes 1005 and 1007 indicate that the corresponding reference images are used for inspection, respectively. When the button 406 is selected after selection of the reference image, the verification apparatus 109 starts inspection using the selected inspection image.

Figure 11:
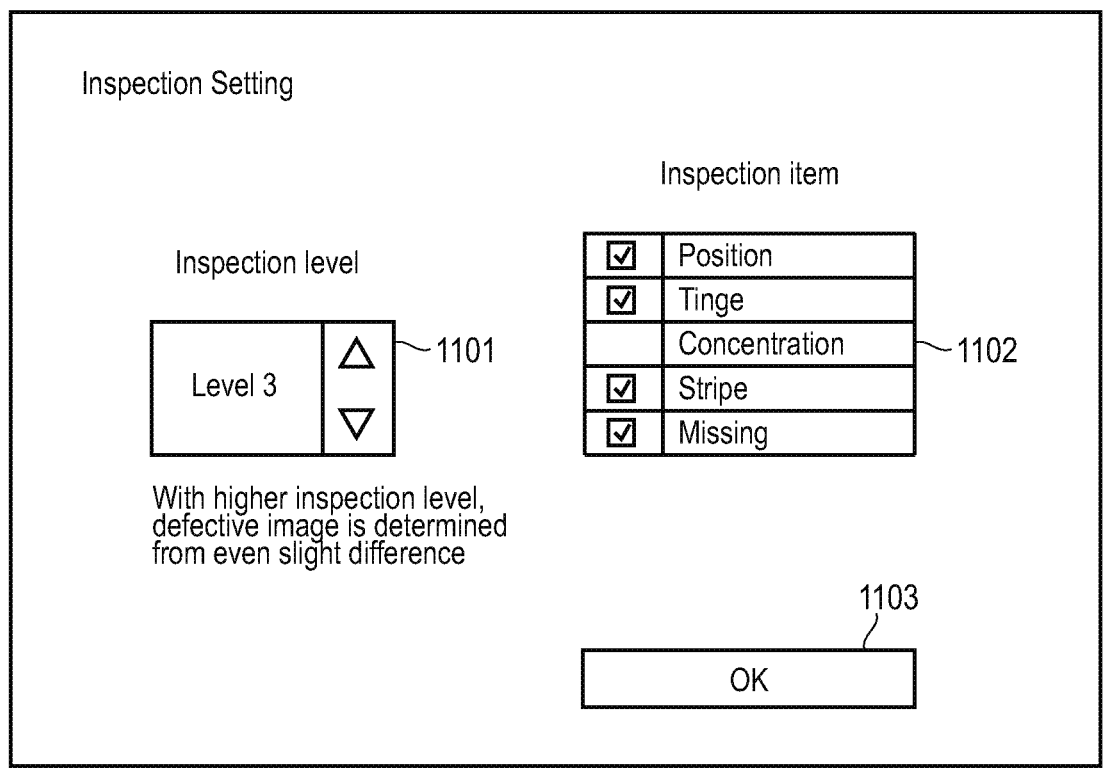
FIG. 11 is a diagram illustrating an example of a window displayed when setting of inspection is performed.

FIG. 11 is a diagram illustrating an example of a window displayed on the display unit 241 of the verification apparatus 109 when setting of inspection is performed. The display window of FIG. 11 is displayed when the button 404 of FIG. 4 is selected.

A setting part 1101 is a setting part used for setting an inspection level. Herein, accuracy of inspection can be changed. With a higher level of inspection accuracy, the verification apparatus 109 determines a defective image from an even slight difference between a reference image and a read image.

A setting part 1102 is a setting part used for setting an inspection item. The user may set one or more inspection items in accordance with the purpose of inspection by using the setting part 1102. In the example of FIG. 11, it is illustrated that "position", "tinge", "stripe", and "missing" are inspection targets but "concentration" is not an inspection target.

FIG. 12 is a diagram illustrating an example of a window displayed on the display unit 241 of the verification apparatus 109 when an inspection result is displayed. The display window of FIG. 12 is displayed when the button 405 of FIG. 4 is selected.

In a display part 1201, the attribute of the overall job on which inspection has been performed and an inspection result are displayed.

In a case of job where a partition sheet is set, an inspection result for each partition sheet is displayed in the display part 1201. A selection part 1203 is a selection part of a job for which an inspection result is displayed. In the example of FIG. 12, the inspection result of the first job is displayed out of three jobs for which histories are stored. The user may switch the displayed job by operating the left and right buttons in the selection part 1203.

A button 1204 is a button indicating that check of an inspection result is completed. When the button 1204 is selected, the verification apparatus 109 returns the window to the display window of FIG. 4.

Figure 13:
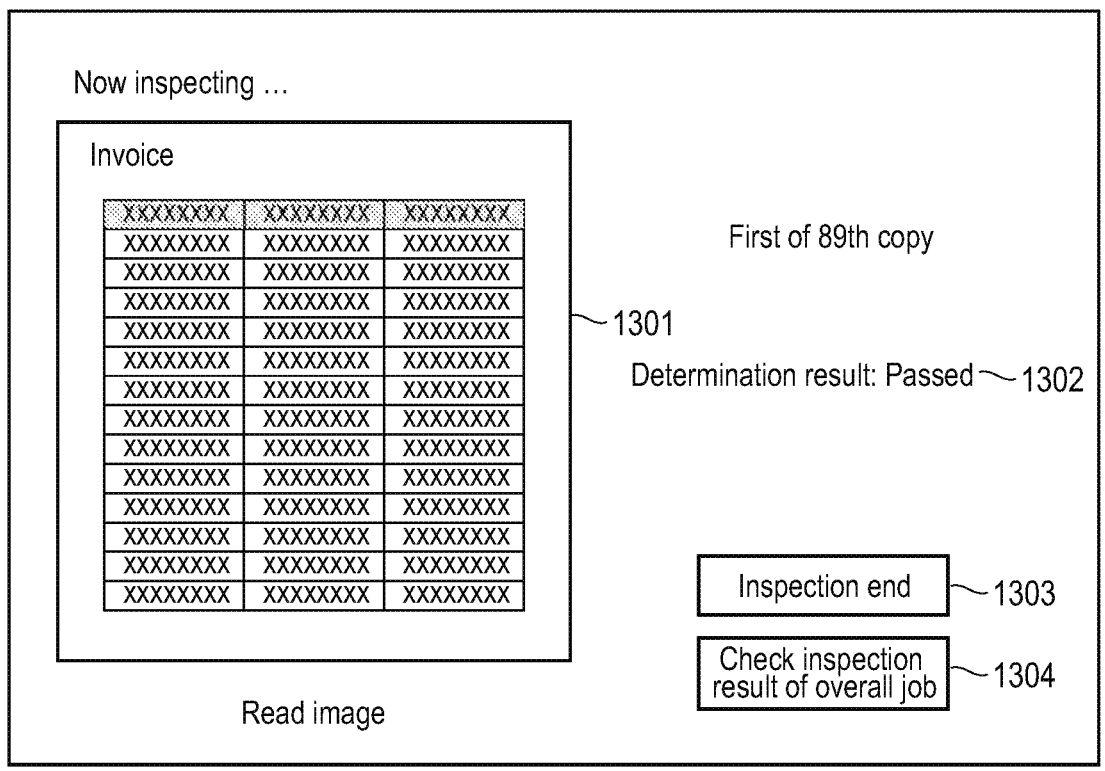
FIG. 13 is a diagram illustrating an example of a window displayed after inspection is started.

FIG. 13 is a diagram illustrating an example of a window displayed on the display unit 241 of the verification apparatus 109 after inspection is started. The display window of FIG. 13 is displayed when the button 407 of FIG. 4 is selected.

In a display part 1301, an image of the last print sheet read by the verification apparatus 109 is displayed.

In a display part 1302, a determination result obtained by comparing a read image with a reference image is displayed. In the example of FIG. 13, since the image is determined to be a normal image, an indication of "Passed" is displayed.

A button 1303 is a button used for providing an instruction to end inspection. When the button 1303 is selected, the verification apparatus 109 ends the inspection process and returns the window to the display window of FIG. 4.

A button 1304 is a button used for providing an instruction to display a check window of an inspection result of the overall job. When the button 1304 is selected, the inspection result of FIG. 12 is displayed.

Figure 14:
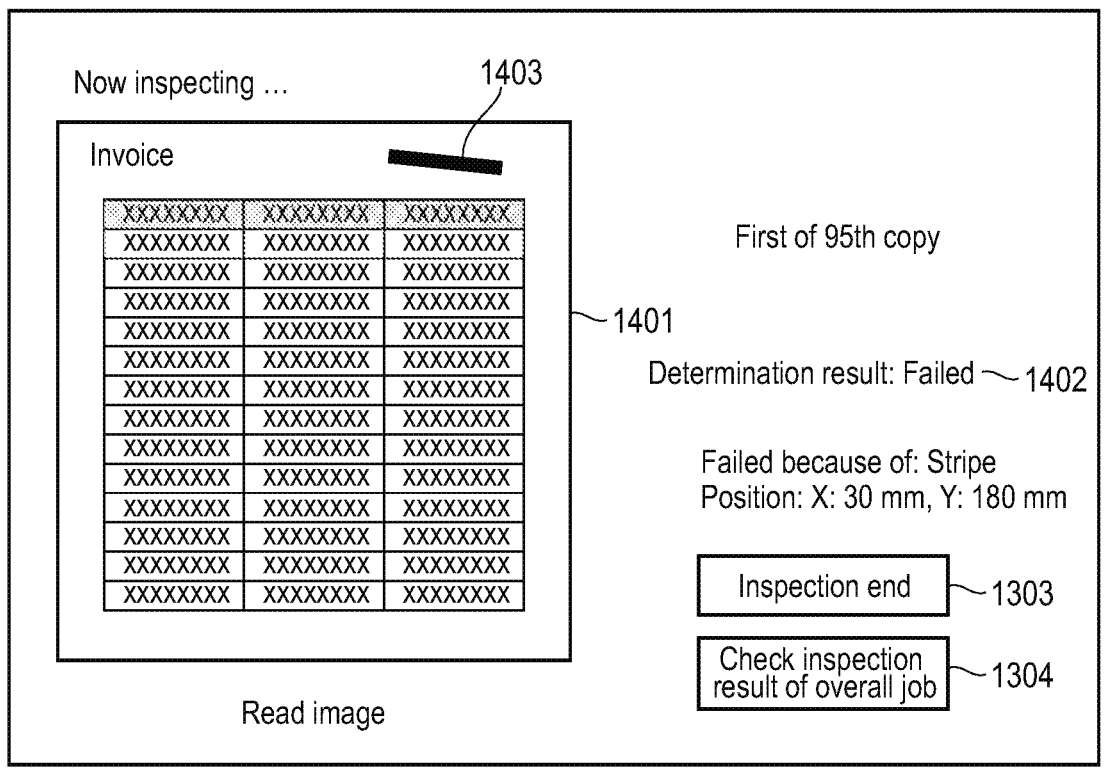
FIG. 14 is a diagram illustrating an example of a window when the last read image is determined to be a defective image.

FIG. 14 is a diagram illustrating an example of a window when the last read image is determined to be a defective image.

Since the image is determined to be a defective image as a result of comparison between a read image 1401 and a reference image, an indication of "Failed", a cause why determined to be defective, and a position where determined to be defective are displayed in an area 1402. In the example of FIG. 14, it is indicated that the image is determined to be a defective image because a stripe 1403 is detected.

FIG. 15 is a diagram illustrating an example of a selection window for an inspection job to be performed that is displayed on the display 212 of the external controller 102. A list 1501 represents a list of inspection jobs received from the client PC 103. The list 1501 represents a state where four jobs are received from the client PC 103 and illustrates a state where three jobs of "Invoice", "Estimate", and "Leaflet" are selected as jobs to be executed. In response to selection of a job to be executed and selection of a button 1502, the verification apparatus 109 changes the window to a setting window for an inspection job of FIG. 16.

Figure 16:
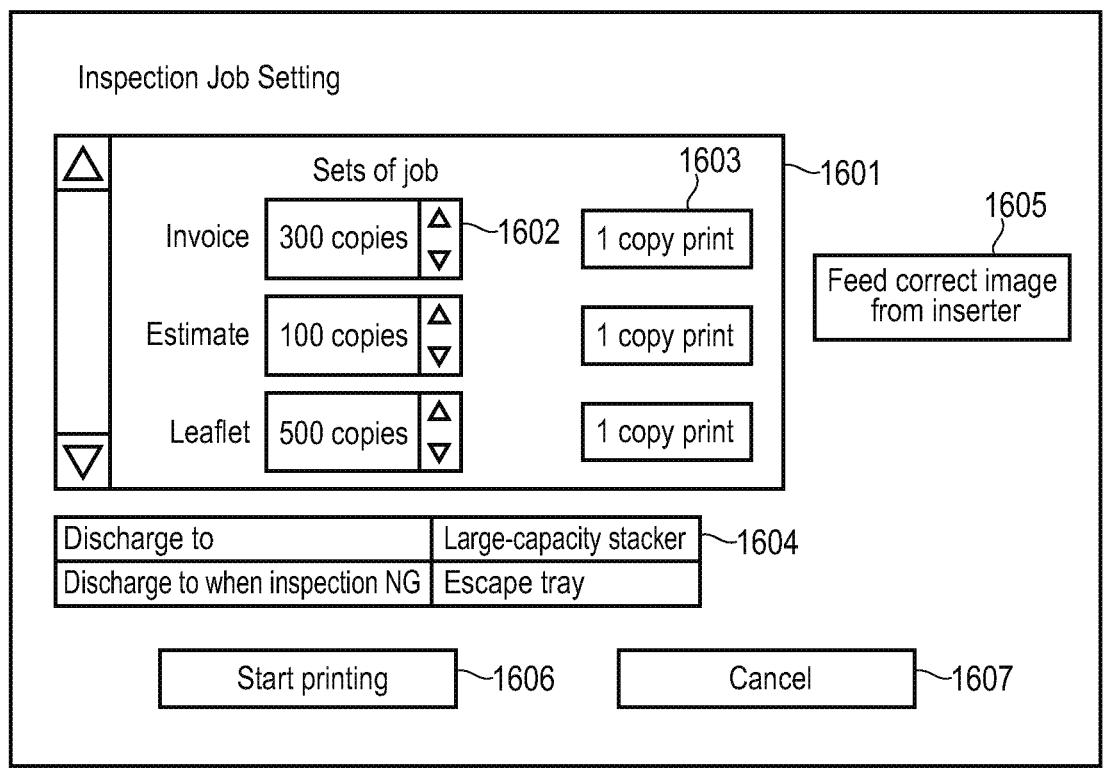
FIG. 16 is a diagram illustrating an example of a setting window for an inspection job.

FIG. 16 is a diagram illustrating an example of a setting window for an inspection job displayed on the display 212 of the external controller 102. FIG. 4 to FIG. 16 are window examples when setting of inspection is performed on the verification apparatus 109, and an instruction to send a print sheet of a reference image, a sheet with a printed barcode, and a print sheet to be inspected to the verification apparatus 109 is provided from the external controller 102.

A setting part 1601 is a setting part for each job selected from the list 1501.

A setting part 1602 is a setting part used for setting the number of copies of jobs. In the example of FIG. 16, printing of 900 copies of jobs is set.

A button 1603 is a button that provides an instruction to print only one copy of an inspection job. After the verification apparatus 109 is instructed to start registration of a reference image by the button 503 of FIG. 5, when the external controller 102 is instructed to print one copy of an inspection job by the button 1603, a print process is performed by the print apparatus 107, and reading of a reference image switching sheet and a reference image is performed by the verification apparatus 109.

A setting part 1604 is a setting part used for setting a sheet discharging destination for an inspection job. Herein, the large-capacity stacker is set as the sheet discharging destination, and the escape tray is set as the sheet discharging destination to which a sheet is discharged when the image is determined to be a defective image by inspection.

A button 1605 is a button that provides an instruction to feed a reference image from the inserter. The button 1605 is used when a printed print sheet that has already been printed is read from the inserter as a reference image. The button 1605 is used when reading a reference image after the image is determined to be a reference image by visual inspection by the user instead of performing printing and registration of a reference image at the same time. When using the button 1605, the user places a print sheet to be registered as a reference image and a sheet with a printed barcode on the tray 321 of the inserter 108 in advance, which are conveyed to the verification apparatus 109 accordingly. In this example, a sheet may be fed from the sheet feed unit 230 of the print apparatus 107, however, if a sheet is fed from the sheet feed unit 230, an image of the print sheet may be deformed because the sheet passes through the fixing unit 311 and the second fixing unit 313 and is subjected to pressing and heat. Thus, when a printed print sheet is registered as a reference image, it is desirable to feed a sheet from the inserter 108 so as not to pass through a fixing device.

The button 1606 is a button used for providing an instruction to start printing of an inspection job. In response to an instruction to start printing by the button 1606, the external controller 102 supplies an inspection job to the print apparatus 107 based on the setting in FIG. 16. The user instructs the verification apparatus 109 to start inspection via the button 406 of FIG. 4 and then instructs the external controller 102 to start printing of an inspection job via the button 1606. In response, the external controller 102 supplies print data to the print apparatus 107 and provides an instruction to convey the printed print sheet to the verification apparatus 109. In response to the print sheet being conveyed, the verification apparatus 109 reads the image of the print sheet and performs an inspection process.

Figure 17:
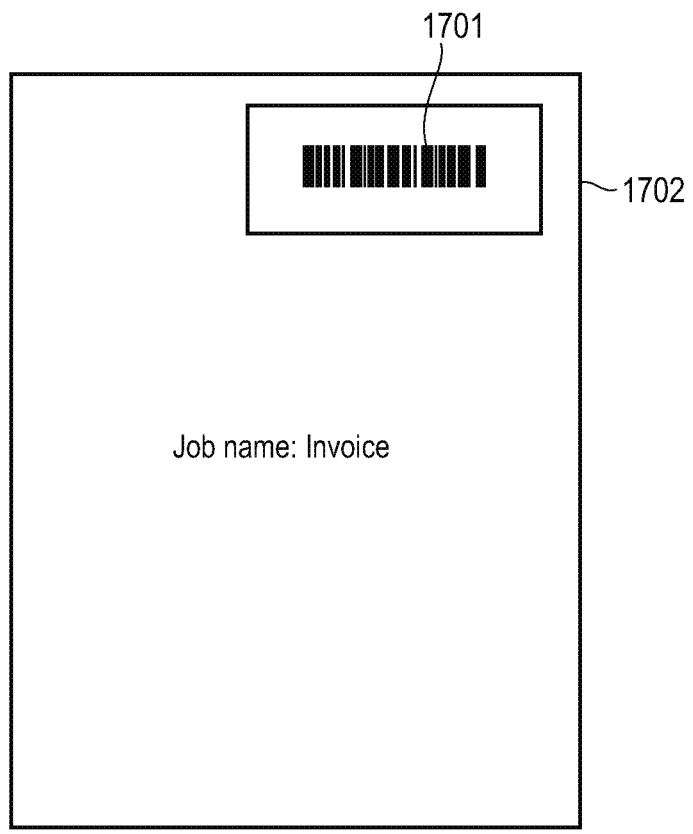
FIG. 17 is a diagram illustrating an example of a reference image switching sheet.

FIG. 17 is a diagram illustrating an example of a reference image switching sheet printed by the print apparatus 107 at the head of a job. A barcode 1701 is a barcode generated by the external controller 102 when a reference image is registered. A unique barcode is generated for each job. A barcode inspection region 1702 is a barcode inspection region to be inspected as to whether or not a barcode is present when inspection is performed by the verification apparatus 109. When a reference image is registered, the verification apparatus 109 trims and holds, in the memory 239, the barcode inspection region 1702 of the image of the read reference image switching sheet. When the inspection is performed, the verification apparatus 109 compares an image at a position corresponding to the barcode inspection region 1702 in the inspection target image with a barcode image held in the memory 239 and determines whether or not the read image is the reference image switching sheet. Comparison of barcodes is performed for the number of barcodes held in the memory 239.

Figure 18:
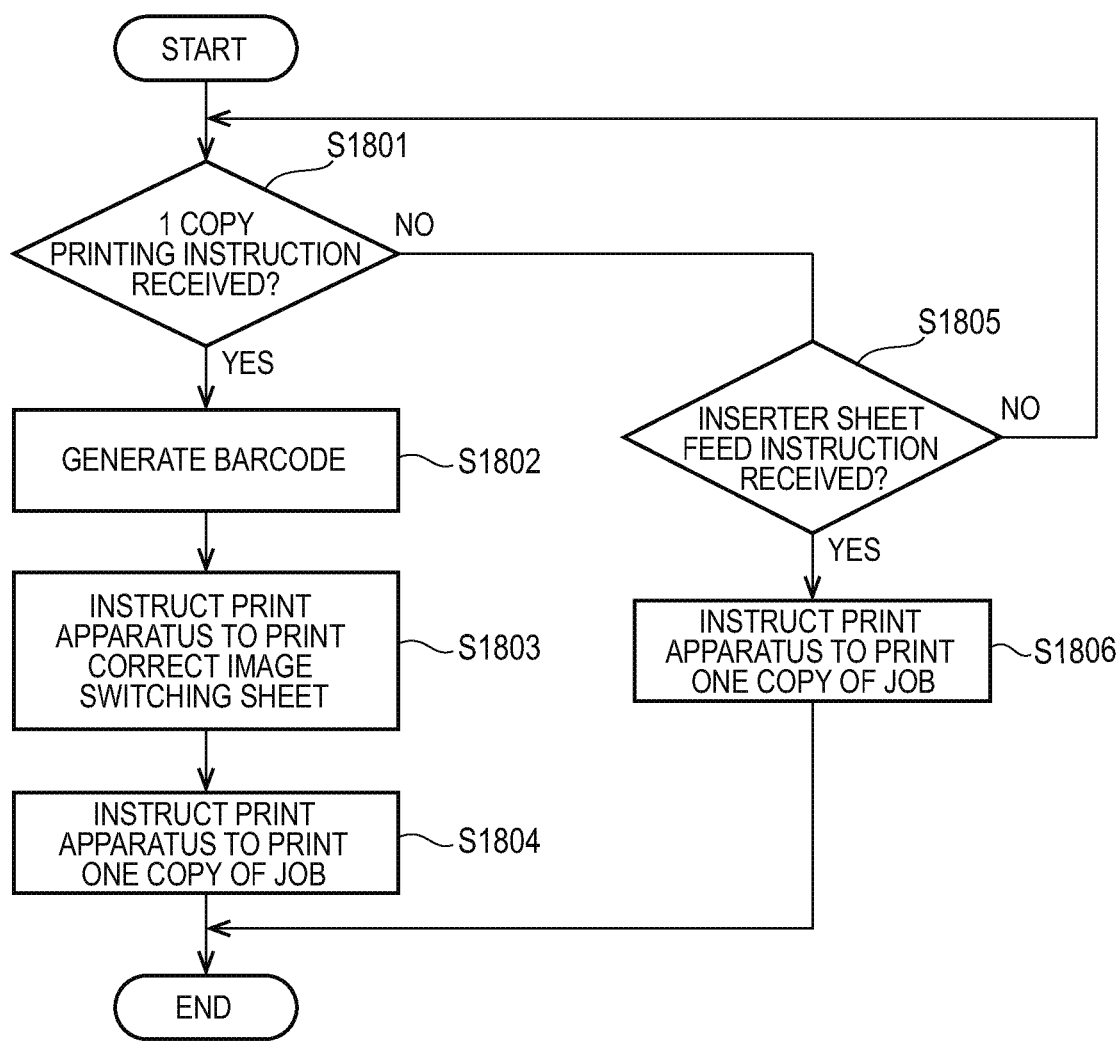
FIG. 18 is a flowchart illustrating a flow of information processing performed by an external controller when a reference image is registered.

FIG. 18 is a flowchart illustrating a flow of information processing performed by the external controller 102 when a reference image is registered. The process of FIG. 18 is performed by the CPU 208 of the external controller 102.

In step S1801, the CPU 208 determines whether or not a print instruction for one copy of a print job is received. When the button 1603 of FIG. 16 is selected, a print instruction for one copy of a print job is transmitted to the external controller 102.

If a print instruction for one copy is received in step S1801, the CPU 208 proceeds to step S1802. In step S1802, the CPU 208 generates a unique barcode and stores a print image and the barcode in the memory 209 in association with each other.

In step S1803, the CPU 208 instructs the print apparatus 107 to print a reference image switching sheet based on the generated barcode.

In step S1804, the CPU 208 supplies print data for one copy to the print apparatus 107 and instructs the print apparatus 107 to perform printing.

If a print instruction for one copy is not received in step S1801, the CPU 208 proceeds to step S1805. In step S1805, the CPU 208 determines whether or not a sheet feed instruction from the inserter 108 is received. When the button 1605 of FIG. 16 is selected, a sheet feed instruction from the inserter 108 is transmitted to the external controller 102.

If a sheet feed instruction from the inserter is received in step S1805, the CPU 208 proceeds to step S1806.

In step S1806, the CPU 208 instructs the print apparatus 107 to feed a sheet from the inserter 108 for the number of sheets of one copy including the reference image switching sheet.

If a sheet feed instruction from the inserter is not received in step S1805, the CPU 208 returns to step S1801.

Figure 19:
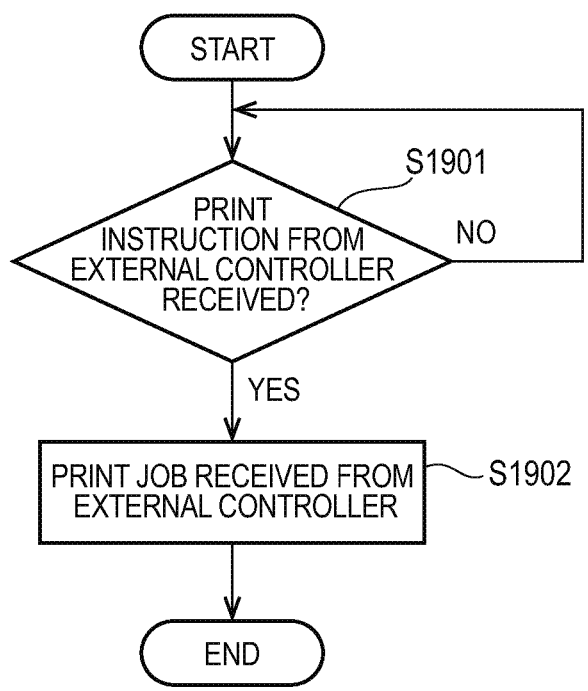
FIG. 19 is a flowchart illustrating a flow of information processing performed by a print apparatus when a reference image is registered.

FIG. 19 is a flowchart illustrating a flow of information processing performed by the print apparatus 107 when a reference image is registered. The process of FIG. 19 is performed by the CPU 222 of the print apparatus 107.

In step S1901, the CPU 222 waits for receiving a print instruction from the external controller 102.

In step S1803, step S1804, and step S1806 of FIG. 18, a print instruction is transmitted from the external controller 102 to the print apparatus 107.

If a print instruction from the external controller 102 is received in step S1901, the CPU 222 proceeds to step S1902. In step S1902, the CPU 222 prints a job received from the external controller 102. The job received from the external controller 102 includes information on a sheet feeding destination or a sheet discharging destination in addition to image data. The CPU 222 controls the inserter 108, the verification apparatus 109, the large-capacity stacker 110, and the finisher 111 via the communication cable 255 in accordance with the content of the job received from the external controller 102.

Figure 20:
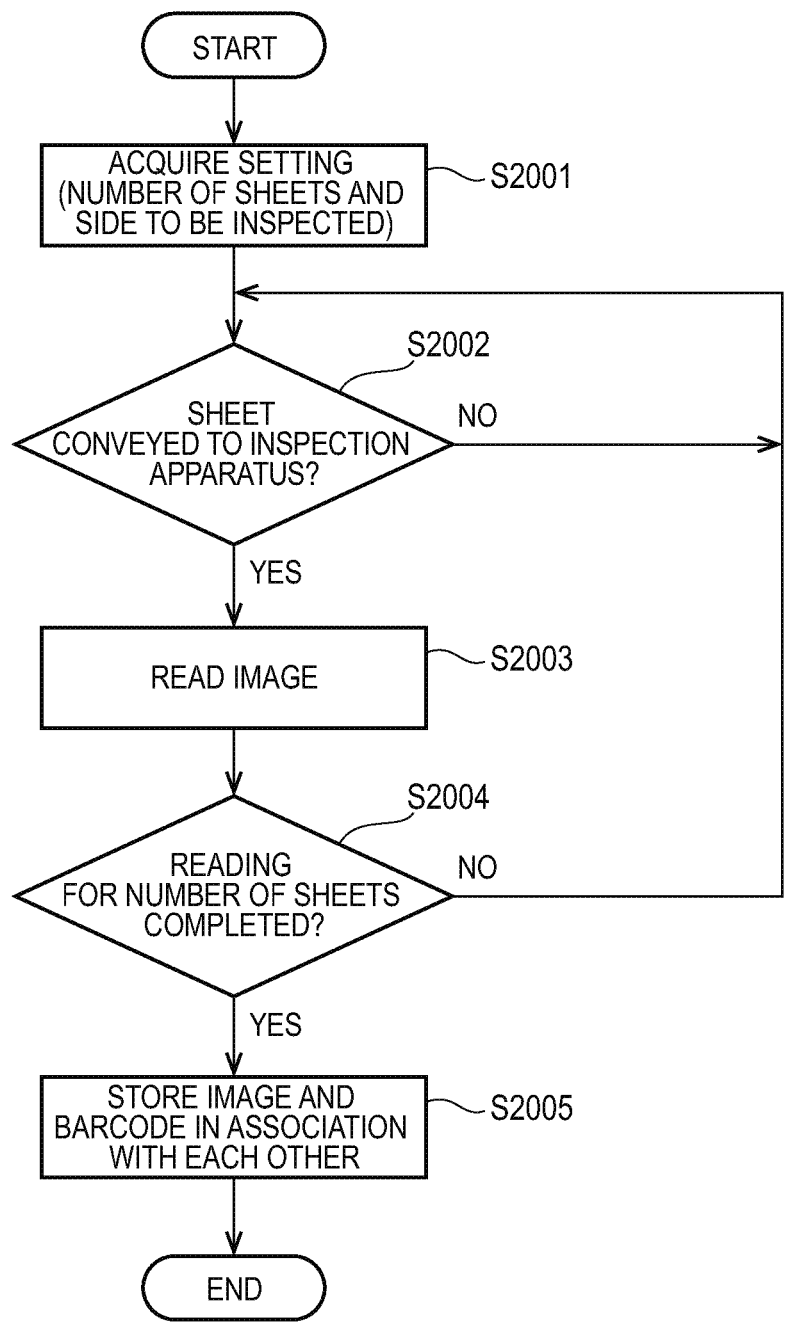
FIG. 20 is a flowchart illustrating a flow of information processing performed by a verification apparatus when a reference image is registered.

FIG. 20 is a flowchart illustrating a flow of information processing performed by the verification apparatus 109 when a reference image is registered. The process of FIG. 20 is performed by the CPU 238 of the verification apparatus 109.

In step S2001, the CPU 238 acquires a print setting. Setting values acquired in step S2001 include the number of sheets per one copy and a side to be inspected that are set in FIG. 5 or the like.

Next, in step S2002, the CPU 238 waits for a sheet being conveyed to the verification apparatus 109.

When a sheet is conveyed in step S2002, the CPU 238 proceeds to step S2003. In step S2003, the CPU 238 uses the camera 331 and the camera 332 to read an image of the sheet and stores the read image in the memory 239. The image stored herein is displayed on the display part 701 of FIG. 7.

Next, in step S2004, the CPU 238 determines whether or not images for the number of sheets acquired in step S2001 has been read. If reading of images is completed, the CPU 238 proceeds to step S2005.

In step S2005, the CPU 238 trims a barcode inspection region of a reference image switching sheet held in the memory 239 and stores the trimmed region in the memory 239 in association with an image of an inspection target.

If reading of images for the number of sheets is not yet completed in step S2004, the CPU 238 returns to step S2002.

Figure 21:
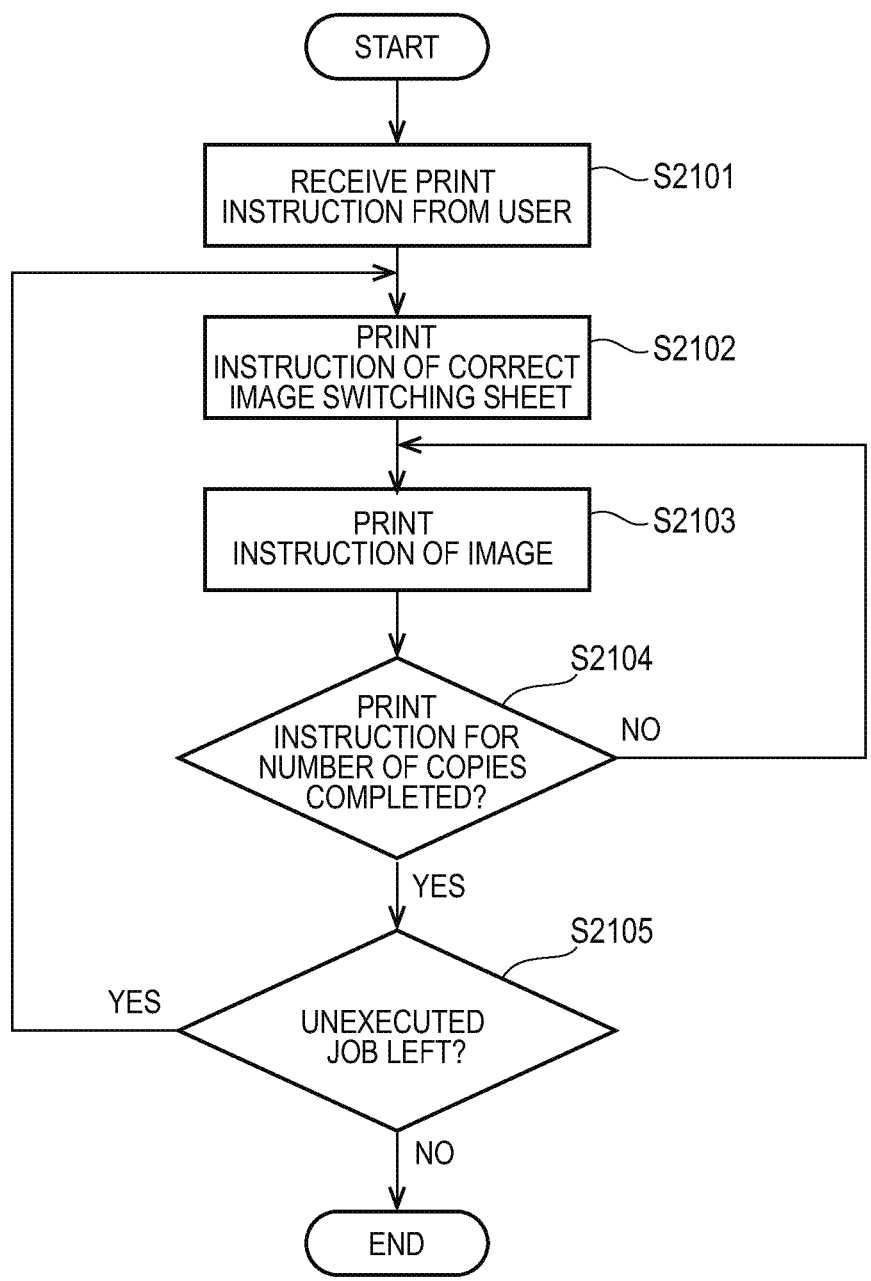
FIG. 21 is a flowchart illustrating a flow of information processing performed by the external controller when an inspection process is performed.

FIG. 21 is a flowchart illustrating a flow of information processing performed by the external controller 102 when an inspection process is performed. The process of FIG. 21 is performed by the CPU 208 of the external controller 102.

When the button 1606 of FIG. 16 is selected, the information processing of FIG. 21 is started.

In response to receiving a print instruction from the user in step S2101, the CPU 208 acquires a setting of the number of copies of a job. When an instruction to perform multiple types of jobs is received, the CPU 208 acquires a setting of the number of copies for each of the jobs.

In step S2102, the CPU 208 instructs the print apparatus 107 to print a reference image switching sheet.

In step S2103, the CPU 208 instructs the print apparatus 107 to print an image of an inspection target.

In step S2104, the CPU 208 determines whether or not print instructions for the number of copies are completed.

If print instructions for the number of copies are not yet completed in step S2104, the CPU 208 returns to step S2103.

If print instructions for the number of copies are completed in step S2104, the CPU 208 proceeds to step S2105.

In step S2105, the CPU 208 determines whether or not a job that has not yet been executed is present in the memory 209. If a job that has not yet been executed is present in the memory 209, the CPU 208 returns to step S2102 and provides an instruction to print a reference image switching sheet associated with an inspection target of a job to be next executed.

If a job that has not yet been executed is not present in step S2105, the CPU 208 ends the information processing illustrated in FIG. 21.

Figure 22:
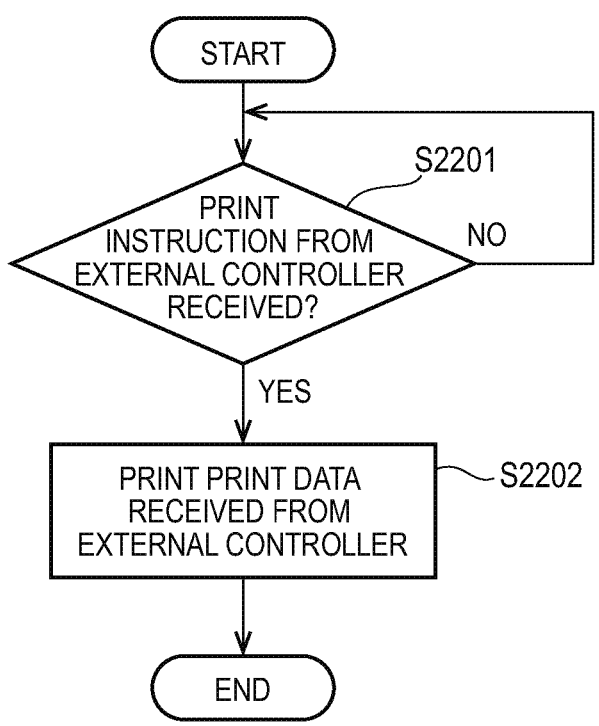
FIG. 22 is a flowchart illustrating a flow of information processing performed by the print apparatus when an inspection process is performed.

FIG. 22 is a flowchart illustrating a flow of information processing performed by the print apparatus 107 when an inspection process is performed. The process of FIG. 22 is performed by the CPU 222 of the print apparatus 107.

In step S2201, the CPU 222 waits for receiving a print instruction from the external controller 102.

When the external controller 102 instructs the print apparatus 107 to perform printing in step S2102 and step S2103 of FIG. 21, a print instruction is transmitted.

If a print instruction from the external controller 102 is received in step S2201, the CPU 222 proceeds to step S2202. In step S2202, the CPU 222 prints a job received from the external controller 102. Herein, the CPU 222 controls the inserter 108, the verification apparatus 109, the large-capacity stacker 110, and the finisher 111 via the communication cable 255 in accordance with the content of the job received from the external controller 102.

Figure 23:
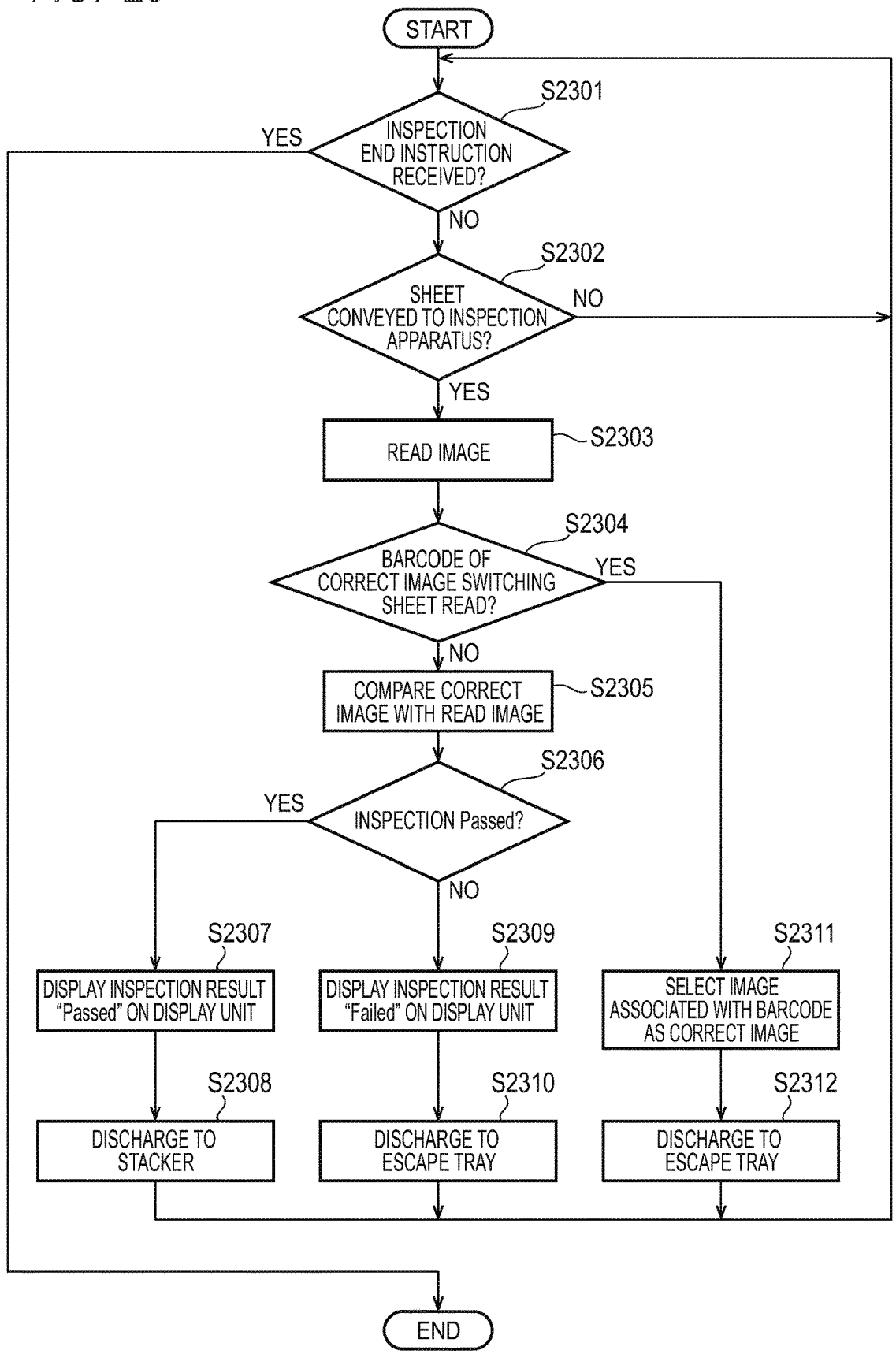
FIG. 23 is a flowchart illustrating a flow of information processing performed by the verification apparatus when an inspection process is performed.

FIG. 23 is a flowchart illustrating a flow of information processing performed by the verification apparatus 109 when an inspection process is performed. The process of FIG. 23 is performed by the CPU 238 of the verification apparatus 109.

In step S2301, the CPU 238 determines whether or not an inspection end instruction is received. The inspection end instruction is transmitted to the verification apparatus 109 when the button 1303 of FIG. 13 is selected.

If an inspection end instruction is received in step S2301, the CPU 238 ends the information processing of FIG. 23.

If an inspection end instruction is not received in step S2301, the CPU 238 proceeds to step S2302.

In step S2302, the CPU 238 determines whether or not a sheet is conveyed to the verification apparatus 109. If no sheet is conveyed in step S2302, the CPU 238 returns to step S2301.

If a sheet is conveyed in step S2302, the CPU 238 proceeds to step S2303. In step S2303, the CPU 238 uses the camera 331 and the camera 332 to read an image of the sheet and stores the read image in the memory 239 of the verification apparatus 109. The image stored herein is displayed on the display part 1301 of FIG. 13.

In step S2304, the CPU 238 determines whether or not the image read in step S2303 is a reference image switching sheet. More specifically, the CPU 238 performs the determination by comparing a portion corresponding to the barcode inspection region of the read image with a barcode image held in the memory 239. At this time, the CPU 238 performs comparison for the number of barcodes held in the memory 239.

If a barcode of a reference image switching sheet is read in step S2304, the CPU 238 proceeds to step S2311. In step S2311, the CPU 238 selects an image associated with a barcode in the memory 239 as a reference image.

In step S2312, the CPU 238 instructs the large-capacity stacker 110 to discharge the reference image switching sheet to the escape tray 346.

Next, the CPU 238 returns to step S2301 and continues the process.

If the read image is not a reference image switching sheet in step S2304, the CPU 238 proceeds to step S2305.

In step S2305, the CPU 238 compares an image read in step S2303 (read image) with a reference image. The reference image is based on a setting registered for the verification apparatus 109 from 403 of FIG. 4. The item to be compared in step S2305 is based on an inspection level set in the setting part 1101 and an inspection item set in the setting part 1102 of FIG. 11.

Next, the CPU 238 proceeds to step S2306 and determines whether a result of comparison with the reference image in step S2305 indicates a normal image or a defective image.

If the image is determined as a normal image (inspection passed) in step S2306, the CPU 238 proceeds to step S2307. In step S2307, the CPU 238 displays the inspection result with an indication of "Passed" on the display unit 241 of the verification apparatus 109. FIG. 13 is a diagram illustrating an example of a window displayed in step S2307.

Next, in step S2308, the CPU 238 instructs the print apparatus 107 to discharge the print sheet to the stack tray 341 of the large-capacity stacker 110. The sheet discharging destination here is based on a sheet discharging destination set in the setting part 1604 of FIG. 16. The print apparatus 107 instructs the large-capacity stacker 110 to discharge the sheet to the stack tray 341 based on the instruction from the verification apparatus 109.

Next, the CPU 238 returns to step S2301 and continues the process.

If the image is determined as a defective image (inspection failed) in step S2306, the CPU 238 proceeds to step S2309. In step S2309, the CPU 238 displays the inspection result with an indication of "Failed" on the display unit 241 of the verification apparatus 109. FIG. 14 is an example of a window displayed in step S2309.

Next, in step S2310, the CPU 238 instructs the print apparatus 107 to discharge the print sheet to the escape tray 346 of the large-capacity stacker 110. The sheet discharging destination is based on a sheet discharging destination for the case of an image determined to be defective, which is set in the setting part 1604 of FIG. 16. The print apparatus 107 instructs the large-capacity stacker 110 to discharge the sheet to the escape tray 346 based on the instruction from the verification apparatus 109.

Next, the CPU 238 returns to step S2301 and continues the process.

Modified Example

Although the setting of the verification apparatus 109 is operated by using the display unit 241 of the verification apparatus 109 and the print instruction for an inspection job is operated by using the display 212 of the external controller 102 in the first embodiment, the embodiment is not limited to such a configuration. The inspection setting and the print instruction may be configured in a different manner as long as the inspection setting and the print instruction can be operated by any of the external controller 102, the print apparatus 107, the verification apparatus 109, and the client PC 103. For example, both of the inspection setting and the print instruction may be operated by using the display 225 of the print apparatus 107.

Further, while held in the memory 209 of the external controller 102 and the memory 239 of the verification apparatus 109 in the first embodiment, a reference image may be held on a server that can be accessed by the external controller 102 and the verification apparatus 109.

Further, in a case configured to execute a job to insert a partition sheet for each particular number of copies in order to perform management on a bundle basis, the print apparatus 107 may be configured to print a barcode associated with a reference image on a partition sheet inserted in the head of each job and use a part of the partition sheet between bundles as a reference image switching sheet.

Further, although reading and registration of a reference image are performed by conveying a reference image switching sheet and an inspection target image to the verification apparatus 109 by using separate sheets in the first embodiment, the embodiment is not limited to such a configuration. A barcode associated with a reference image conveyed to the verification apparatus 109 and an inspection target image may be printed on the same sheet when the reference image is registered. More specifically, an inspection target may be printed on a sheet that is larger than the sheet size of an inspection target image, a barcode associated with a reference image may be printed in the blank area thereof, and the verification apparatus 109 may trim and register the region of the reference image and the region of the barcode, respectively.

Other Embodiments

Although an example of the embodiment of the present disclosure has been described in detail above, the present disclosure is not limited to such a particular embodiment.

Although illustration has been provided with an example of a print sheet in the embodiment described above, the same applies to a printing sheet.

As set forth, according to each embodiment described above, even in a configuration in which a print apparatus and a verification apparatus are unable to directly communicate with each other, it is possible to automatically switch reference images and improve the productivity of inspection.

Embodiments of the present disclosure can also be realized by a computerized configurations of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computerized configurations of the system or apparatus by, for example, reading out and executing the computer executable instructions from the storage medium to perform the functions of one or more of the above-described embodiments and/or controlling the one or more circuits to perform the functions of one or more of the above-described embodiments. The computerized configurations may comprise one or more processors, one or more memories, circuitry, or a combination thereof (e.g., central processing unit (CPU), micro processing unit (MPU), or the like) and may include a network of separate computers or separate processors to read out and execute the computer executable instructions. The computer executable instructions may be provided to the computerized configuration(s), for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of priority from Japanese Patent Application No. 2019-164557, filed on Sep. 10, 2019, which is hereby incorporated by reference herein in its entirety.

What is claimed is:

1. An inspection system comprising:
one or more controllers including one or more processors, the one or more controllers configured to:
register a plurality of reference images;
print an image on a sheet;
read the printed image, the printed image including a code;
select a reference image associated with the code from the plurality of reference images; and
inspect the read image based on the selected reference image.

2. The inspection system according to claim 1, wherein the one or more controllers are further configured to determine whether or not the code is read,
wherein if determined that the code is read, the one or more controllers select an image associated with the code as the reference image.

3. The inspection system according to claim 1, wherein the one or more controllers are further configured to:
store the reference image and the code in a memory, the reference image and the code associated with each other; and
select an image associated with the code from the memory as the reference image.

4. The inspection system according to claim 1, wherein the one or more controllers are further configured to:
compare the reference image with the read image; and
provide, if the inspection shows a defect in the read image as a result of the comparison, an instruction to discharge the sheet to a set sheet discharging destination.

5. A non-transitory computer-readable storage medium storing a program that, when executed by a computer, causes the computer to function as the one or more controllers of the inspection system according to claim 1.

6. The inspection system according to claim 1, wherein the one or more controllers are further configured not to switch the reference image to another one of the plurality of reference images in case of reading an image that does not include the code printed.

7. The inspection system according to claim 1, wherein the respective reference images of the plurality of reference images registered are associated with different codes.

8. The inspection system according to claim 1, wherein the code is a barcode.

9. An information processing method performed by an inspection system, the information processing method comprising:
registering a plurality of reference images;
printing an image on a sheet;
reading the printed image, the printed image including a code;
selecting a reference image associated with the code from the plurality of reference images; and
inspecting the read image based on the selected reference image.

10. The information processing method according to claim 9 further comprising:
determining whether or not the code is read; and, selecting, if the determining determines that the code is read, an image associated with the code as the reference image.

11. The information processing method according to claim 9 further comprising storing the reference image and the code in a memory, the reference image and the code associated with each other,
   wherein the selecting includes selecting an image associated with the code from the memory as the reference image.

12. The information processing method according to claim 9 further comprising:
   comparing the reference image with the read image; and
   providing, if the inspection shows a defect in the read image as a result of the comparison, an instruction to discharge the sheet to a set sheet discharging destination.

\* \* \* \* \*